US010941252B2

(12) United States Patent
Cohen et al.

(10) Patent No.: US 10,941,252 B2
(45) Date of Patent: Mar. 9, 2021

(54) SILICONE COPOLYMERS, METHODS OF MAKING, AND ARTICLES

(71) Applicant: 3M INNOVATIVE PROPERTIES COMPANY, Saint Paul, MN (US)

(72) Inventors: Hannah C. Cohen, Saint Paul, MN (US); Amanda C. Engler, Woodbury, MN (US); Ranjani V. Parthasarathy, Woodbury, MN (US); Haoming Rong, Woodbury, MN (US); Ramesh C. Kumar, Woodbury, MN (US); Matthew T. Scholz, Woodbury, MN (US); James P. Dizio, Saint Paul, MN (US); Audrey A. Sherman, Woodbury, MN (US); Richard G. Hansen, Mahtomedi, MN (US); Douglas A. Hanggi, Woodbury, MN (US); Dale J. Case, Oakdale, MN (US); David Duane Johnson, Saint Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 24 days.

(21) Appl. No.: 16/345,809

(22) PCT Filed: Oct. 23, 2017

(86) PCT No.: PCT/US2017/057817
§ 371 (c)(1),
(2) Date: Apr. 29, 2019

(87) PCT Pub. No.: WO2018/085066
PCT Pub. Date: May 11, 2018

(65) Prior Publication Data
US 2019/0263972 A1 Aug. 29, 2019

Related U.S. Application Data

(60) Provisional application No. 62/417,146, filed on Nov. 3, 2016.

(51) Int. Cl.
| C08G 77/46 | (2006.01) |
| C08G 77/458 | (2006.01) |
| C08K 5/00 | (2006.01) |
| C08G 64/18 | (2006.01) |

(52) U.S. Cl.
CPC ......... *C08G 77/458* (2013.01); *C08G 64/186* (2013.01); *C08G 77/46* (2013.01); *C08K 5/005* (2013.01)

(58) Field of Classification Search
None
See application file for complete search history.

(56) References Cited

U.S. PATENT DOCUMENTS

| 850,031 A | 7/1978 | Rosenblatt |
| 4,119,615 A | 10/1978 | Schulze |
| 4,396,530 A | 8/1983 | Duke |
| 4,487,808 A | 12/1984 | Lambert |
| 4,589,873 A | 5/1986 | Schwartz |
| 4,642,267 A | 2/1987 | Creasy |
| 4,686,137 A * | 8/1987 | Ward, Jr. ............... A61L 33/062 |
| | | 428/423.1 |
| 4,689,338 A | 8/1987 | Gerster |
| 4,713,446 A | 12/1987 | DeVore |
| 4,729,914 A | 3/1988 | Kliment |
| 4,766,186 A | 8/1988 | Sellstrom |

(Continued)

FOREIGN PATENT DOCUMENTS

| CA | 2632120 | 6/2007 |
| CA | 2856230 | 6/2013 |

(Continued)

OTHER PUBLICATIONS

Wang et al. "Synthesis and characterization of organosiloxane modified segmented polyether polyurethanes" Polymer, 41, 2000, 5083-5093. (Year: 2000).*

Pergal et al. "Synthesis and Characterization of Novel Urethane-Siloxane Copolymers with a High Content of PCL-PDMS-PCL Segments" Journal of Applied Polymer Science, 122, 2011, 2715-2730. (Year: 2011).*

David J. Kinning "Bulk, Surface, and Interfacial Characterization of Silicone-Polyurea Segmented Copolymers" J. Adhesion, 5, 2001 , 1-26. (Year: 2001).*

Brouchhausen, "Current Strategies and Future Perspectives for Intraperitoneal Adhesion Prevention", J Gastrointest Surg, 2012, vol. 16,pp. 1256-1274.

Decker, "Radiation-Induced Oxidation of Solid Poly(ethylene Oxide). I. Experimental Results", Journal of Polymer Science, 1977, vol. 15, pp. 781-798.

(Continued)

*Primary Examiner* — Robert S Loewe
(74) *Attorney, Agent, or Firm* — Jeffrey M. Olofson

(57) ABSTRACT

A copolymer composition that includes a silicone copolymer, methods of making the composition, and articles that include the composition, wherein the copolymer composition includes a silicone copolymer having a backbone composition that includes: silicone segments in an amount of 5 wt-% to 40 wt-%, based on the total weight of the silicone copolymer; hydrophilic segments in an amount of 40 wt-% to 75 wt-%, based on the total weight of the silicone copolymer; and reinforcing segments in an amount of 5 wt-% to 30 wt-%, based on the total weight of the silicone copolymer, wherein the reinforcing segments are derived from the reaction of one or more chain extenders with one or more multi-functional isocyanates, multi-functional carboxylic acids, multi-functional anhydrides, multi-functional esters, and/or multi-functional acid halides; wherein the silicone segments, hydrophilic segments, and reinforcing segments are connected through urea, urethane, amide, and/or oxamide linkages; wherein the hydrophilic segments and the reinforcing segments are present in a weight ratio of 1.8:1 to 8:1; and the hydrophilic segments and the silicone segments are present in a weight ratio of 1.3:1 to 4.5:1.

18 Claims, No Drawings

(56) References Cited

U.S. PATENT DOCUMENTS

| | | | |
|---|---|---|---|
| 4,777,943 A | 10/1988 | Chvapil | |
| 4,838,253 A | 6/1989 | Brassington | |
| 4,990,357 A | 2/1991 | Karakelle | |
| 5,135,472 A | 8/1992 | Hermann | |
| 5,169,720 A | 12/1992 | Braatz | |
| 5,356,706 A | 10/1994 | Shores | |
| 5,429,589 A | 7/1995 | Cartmell | |
| 5,662,960 A | 9/1997 | Hostettler | |
| 5,776,611 A | 7/1998 | Elton | |
| 5,849,368 A | 12/1998 | Hostettler | |
| 5,914,125 A * | 6/1999 | Andrews | A61F 13/0203 |
| | | | 424/443 |
| 5,932,321 A | 8/1999 | Eisele | |
| 6,020,071 A | 2/2000 | Watson | |
| 6,120,904 A | 9/2000 | Hostettler | |
| 6,265,016 B1 | 7/2001 | Hostettler | |
| 6,313,254 B1 * | 11/2001 | Meijs | C08G 18/4854 |
| | | | 528/26 |
| 6,355,759 B1 | 3/2002 | Sherman | |
| 6,471,982 B1 | 10/2002 | Lydon | |
| 6,709,706 B2 | 3/2004 | Zhong | |
| 1,336,683 A1 | 11/2004 | Hohberg | |
| 7,029,755 B2 | 4/2006 | Terry | |
| 7,262,260 B2 * | 8/2007 | Yilgor | C08G 18/10 |
| | | | 525/474 |
| 7,427,648 B2 | 9/2008 | Ochs | |
| 7,795,467 B1 | 9/2010 | Pacetti | |
| 8,063,166 B2 | 11/2011 | Sherman | |
| 8,198,326 B2 | 6/2012 | Scholz | |
| 8,242,189 B2 * | 8/2012 | Rega | A61L 27/18 |
| | | | 523/122 |
| 8,287,890 B2 | 10/2012 | Elton | |
| 8,334,356 B1 * | 12/2012 | Nowak | C08K 5/29 |
| | | | 528/38 |
| 8,382,663 B2 | 2/2013 | Taylor | |
| 8,481,074 B2 | 7/2013 | Shalaby | |
| 8,647,718 B2 | 2/2014 | Matsumura | |
| 8,853,294 B2 | 10/2014 | Myung | |
| 8,871,869 B2 | 10/2014 | Dias | |
| 9,000,089 B2 | 4/2015 | Heckroth | |
| 9,097,914 B2 | 8/2015 | McCabe | |
| 9,266,989 B2 | 2/2016 | Sherman | |
| 2004/0127121 A1 | 7/2004 | Schwab | |
| 2005/0089539 A1 | 4/2005 | Scholz | |
| 2006/0051384 A1 | 3/2006 | Scholz | |
| 2006/0051385 A1 | 3/2006 | Scholz | |
| 2007/0078197 A1 * | 4/2007 | Samuelsen | C09J 153/02 |
| | | | 523/111 |
| 2011/0112457 A1 * | 5/2011 | Holm | B32B 7/12 |
| | | | 602/52 |
| 2013/0165618 A1 * | 6/2013 | Brust | C09D 11/102 |
| | | | 528/26 |
| 2015/0024019 A1 | 1/2015 | Ali | |
| 2016/0215100 A1 | 7/2016 | Hansen | |
| 2016/0312066 A1 | 10/2016 | Nowak | |

FOREIGN PATENT DOCUMENTS

| | | |
|---|---|---|
| CN | 102702947 | 10/2012 |
| GB | 2434748 | 8/2007 |
| GB | 2496310 | 8/2013 |
| WO | 1991-013602 | 9/1991 |
| WO | 1996-023602 | 8/1996 |
| WO | 1996-023834 | 8/1996 |
| WO | 2003-052019 | 6/2003 |
| WO | 2003-086234 | 10/2003 |
| WO | 2006-002045 | 1/2006 |
| WO | 2012-078923 | 6/2012 |
| WO | 2015-048109 | 4/2015 |

OTHER PUBLICATIONS

DeRoyal, "Surgical Sponges & Towels", Powell, Tennessee, 2014; 20 pages.

Foti, "Mass Spectrometric Detection of Cyclic Oligomers in Polyurethanes and Polyureas", Macromolecules, 1982, vol. 15, pp. 883-885.

Goldstein,"Inpatient Economic Burden of Postoperative Ileus Associated with Abdominal Surgery in the United States", P & T, 2007, vol. 32, No. 2, pp. 82-90.

Greenstein, "Chemistry of the Amino Acids—Table of contents", 1961, vol. 2, John Wiley and Sons, Inc., 9 pages.

O'Brien, "Investigation of the Alamar Blue (resazurin) fluorescent dye for the assessment of mammalian cell cytotoxicity", Eur. J. Biochem., 2000, vol. 267, pp. 5421-5426.

Patel, "Amino Terminated Unsaturated Polyamides and their Application as Epoxy Resin Hardener", Rasāyan J. Chem., 2010, vol. 3, No. 1, pp. 127-132.

Reich, "Laparoscopic Surgery for Adhesiolysis", ObGyn.net, 2011, 13 pages.

Zahn, "Oligomers and Pleionomers of Synthetic Fiber-Forming Polymers", Angew. Chem. Internat. Edit., 1963, vol. 2, No. 8, pp. 410-420.

International Search report for PCT International Application No. PCT/US2017/057817 dated Feb. 2, 2018, 4 pages.

* cited by examiner

SILICONE COPOLYMERS, METHODS OF MAKING, AND ARTICLES

CROSS REFERENCE TO RELATED APPLICATIONS

This application is a national stage filing under 35 U.S.C. 371 of PCT/US2017/057817, filed Oct. 23, 2017, which claims the benefit of U.S. Provisional Application No. 62/417,146, filed Nov. 3, 2016, the disclosure of which is incorporated by reference in its entirety herein.

BACKGROUND

Current retraction systems for open abdominal surgeries utilize metal retractor blades and surgical sponges (e.g., absorbent cotton gauze, foams, and nonwovens in various shapes and sizes). There is a current need for devices that help surgeons to gently and efficiently handle tissue, thus improving clinical outcomes. There are approximately 1.4 million open abdominal surgeries every year in the United States. About 8.5% of those surgeries lead to ileus, which is a temporary cessation of bowel function. Ileus results in nausea, vomiting, bloating, pain, extended hospital stays, and $1.46 billion increased cost for common abdominal procedures. Additionally, peritoneal adhesions can be found in up to 93% of patients undergoing intra-abdominal surgery.

Adhesions are a major cause of chronic abdominal pain, infertility, and intestinal obstructions and lead to elevated rates of reoperation, longer operation time, and increased risk of intraoperative complications. The treatment of peritoneal adhesions costs $1.3 billion per year in the United States.

What is needed are new materials that can be used in abdominal surgeries, as well as in other medical and personal care applications.

SUMMARY

The present disclosure provides copolymer compositions that include a silicone copolymer, methods of making the copolymers and compositions, and articles that include the compositions. Such copolymer compositions can be used in surgical lap sponges (e.g., absorbent cotton gauze, foams, and nonwovens in various shapes and sizes) and retractors to provide lubricious (i.e., low friction) and tissue friendly surfaces, as well as in other medical and personal care applications.

In certain embodiments, a copolymer composition includes a silicone copolymer having a backbone composition comprising: silicone segments in an amount of 5 percent by weight (wt-%) to 40 wt-%, based on the total weight of the copolymer; hydrophilic segments in an amount of 40 wt-% to 75 wt-%, based on the total weight of the copolymer; and reinforcing segments in an amount of 5 wt-% to 30 wt-%, based on the total weight of the copolymer, wherein the reinforcing segments are derived from the reaction of one or more chain extenders with one or more multi-functional isocyanates, multi-functional carboxylic acids, multi-functional anhydrides, multi-functional esters, and/or multi-functional acid halides; and wherein the silicone segments, hydrophilic segments, and reinforcing segments are connected through urea, urethane, amide, and/or oxamide linkages.

In the silicone copolymer, the hydrophilic segments and the reinforcing segments are present in a weight ratio of 1.8:1 to 8:1; and the hydrophilic segments and the silicone segments are present in a weight ratio of 1.3:1 to 4.5:1. In certain embodiments, the silicone copolymer is a random copolymer wherein the silicone segments, hydrophilic segments, and reinforcing segments are connected randomly through urea, urethane, amide, and/or oxamide linkages.

In certain embodiments, a method of making a copolymer composition is provided, wherein the method includes forming a silicone copolymer by combining components that include: a silicone segment precursor in an amount of 5 wt-% to 40 wt-%, based on the total weight of the copolymer; a hydrophilic segment precursor comprising hydrophilic groups in an amount of 40 wt-% to 75 wt-%, based on the total weight of the copolymer; and one or more chain extenders and one or more multi-functional isocyanates, multi-functional carboxylic acids, multi-functional anhydrides, multi-functional esters, and/or multi-functional acid halides in amounts sufficient to form reinforcing segments in an amount of 5 wt-% to 30 wt-%, based on the total weight of the copolymer, wherein the silicone segments, hydrophilic segments, and reinforcing segments are connected through urea, urethane, amide, and/or oxamide linkages. The hydrophilic segments and the reinforcing segments are present in a weight ratio of 1.8:1 to 8:1; and the hydrophilic segments and the silicone segments are present in a weight ratio of 1.3:1 to 4.5:1.

The copolymer compositions disclosed herein can be used in various articles. For example, the copolymer composition can be in the form of a mesh, a monofilament or multifilament yarn, a woven web, a nonwoven web, a film, a foam, or a combination thereof. Alternatively, the copolymer composition can form a coating (e.g., a continuous or discontinuous coating) on a substrate, such as a mesh, a monofilament or multifilament yarn, a woven web, a nonwoven web, a film, a foam, or a combination thereof. A particularly desirable coated substrate is a laparotomy ("lap") sponge made of woven cotton gauze.

The term "copolymer" refers to polymers containing two or more different monomeric units or segments, including terpolymers, tetrapolymers, etc.

The term "room temperature" refers to a temperature of about 20° C. to about 25° C.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the disclosure.

Terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements (e.g., preventing and/or treating an affliction means preventing, treating, or both treating and preventing further afflictions).

Various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

All numbers herein are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above Summary section is not intended to describe every embodiment or every implementation of the disclosure. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DETAILED DESCRIPTION

The present disclosure provides copolymer compositions that include a silicone copolymer (i.e., a silicone-containing copolymer), methods of making the copolymers and compositions, and articles that include the compositions.

In certain embodiments, a copolymer composition includes a silicone copolymer having a backbone composition that includes: silicone segments in an amount of 5 wt-% to 40 wt-%, based on the total weight of the silicone copolymer; hydrophilic segments in an amount of 40 wt-% to 75 wt-%, based on the total weight of the silicone copolymer; and reinforcing segments in an amount of 5 wt-% to 30 wt-%, based on the total weight of the silicone copolymer, wherein the reinforcing segments are derived from the reaction of one or more chain extenders with one or more multi-functional isocyanates, multi-functional carboxylic acids, multi-functional anhydrides, multi-functional esters, and/or multi-functional acid halides.

In the silicone copolymers described herein, the silicone segments, hydrophilic segments, and reinforcing segments are connected through urea, urethane, amide, and/or oxamide linkages. In certain embodiments, the silicone segments, hydrophilic segments, and reinforcing segments are connected through urea linkages optionally with urethane linkages, amide linkages, and/or oxamide linkages, in some embodiments, urea linkages only.

In certain embodiments, the hydrophilic segments include polyethylene glycol groups in an amount of 40 wt-% to 75 wt-%, based on the total weight of the copolymer. In certain embodiments, the backbone composition includes additional hydrophilic segments in an amount of up to 10 wt-%, based on the total weight of the copolymer.

In certain embodiments, the silicone copolymer is a random copolymer wherein the silicone segments, hydrophilic segments, and reinforcing segments are connected randomly through urea, urethane, amide, and/or oxamide linkages. In certain embodiments, the silicone segments, hydrophilic segments, and reinforcing segments are connected randomly through urea linkages optionally with urethane, amide, and/or oxamide linkages, and in some embodiments, urea linkages only.

In the silicone copolymer, the hydrophilic segments and the reinforcing segments are present in a weight ratio of 1.8:1 to 8:1; and the hydrophilic segments and the silicone segments are present in a weight ratio of 1.3:1 to 4.5:1.

Such silicone copolymers demonstrate a balance of properties, particularly a balance of hydrophilicity, hydrophobicity, coefficient of friction, strength, flexibility, durability, and compatibility with mammalian tissue (e.g., such that cytotoxicity is very low). This results from the selection of the types, amounts, and relative ratios of the hydrophilic segments, silicone segments, and reinforcing segments. For example, the hydrophilic segments are used in an amount to provide hydrophilicity and flexibility.

In certain embodiments, a copolymer composition of the present disclosure is disposed on a substrate (e.g., a 100% cotton surgical laparotomy sponge) at a coating weight sufficient to provide a coefficient of friction of at least 0.2, when tested wet according to the Friction Test Method described in the Examples Section.

In certain embodiments, a copolymer composition of the present disclosure is disposed on a substrate (e.g., a 100% cotton surgical laparotomy sponge) at a coating weight sufficient to provide a coefficient of friction of up to 0.45, or up to 0.35, when tested wet according to the Friction Test Method described in the Examples Section.

In certain embodiments, a copolymer composition of the present disclosure demonstrates less than 20% by weight of total leached compounds (i.e., leachates or leachables) after sterilizing with gamma irradiation up to 50 kilograys (kGy) and aging for a period of 6 months at 23° C. In certain embodiments, a copolymer composition of the present disclosure demonstrates less than 10% by weight total leached compounds after sterilizing with gamma irradiation up to 50 kGy and aging for a period of 6 months at 23° C.

In certain embodiments, a copolymer composition of the present disclosure has a cell viability of at least 80% when tested according to Cell Viability Test Method described in the Examples Section.

The Silicone Copolymer

The silicone copolymers of the present disclosure have a backbone composition that includes silicone segments, hydrophilic segments, and reinforcing segments. The reinforcing segments are derived from the reaction of one or more chain extenders with one or more multi-functional isocyanates, multi-functional carboxylic acids, multi-functional anhydrides, multi-functional esters, and/or multi-functional acid halides. The silicone segments, hydrophilic segments, and reinforcing segments are connected through urea, urethane, amide, and/or oxamide linkages. In certain embodiments, the silicone copolymer is a random copolymer wherein the silicone segments, hydrophilic segments, and reinforcing segments are connected randomly through urea, urethane, amide, and/or oxamide linkages. The terminal groups may be nonfunctional groups or functional groups depending on the purpose of the silicone copolymers.

In certain embodiments, the number average molecular weight of the silicone copolymer is at least 12,000 grams/mole, or at least 18,000 grams/mole, or at least 24,000 grams/mole, or at least 30,000 grams/mole. In certain embodiments, the number average molecular weight of the silicone copolymer is less than 100,000 grams/mole, or less than 65,000 grams/mole, or less than 50,000 grams/mole, or less than 40,000 grams/mole, or less than 30,000 grams/mole.

In this context, the term "hydrophilic" in the context of copolymer segments means that the hydrophilic segment precursors are soluble in water at room temperature to at least 10 weight percent (wt-%), more preferably at least 20 wt-%, and most preferably at least 40 wt-%, and preferably form optically clear solutions having a path length of 6 centimeters.

Suitable starting materials (i.e., precursors) for the hydrophilic segments of the silicone copolymers of the present disclosure are water soluble at a level of at least 10 wt-% in water at room temperature.

In certain embodiments the hydrophilic segments include polyethylene glycol (PEG) groups.

Exemplary hydrophilic segments include polyethylene glycol groups, polypropylene glycol groups, polybutylene oxide groups, random poly(C2-C4)alkylene oxide groups, polyester groups (such as those derived from hydrophilic polyesters (e.g., polyPEG400 succinate)), amine-terminated polyester groups, amine-terminated polyamide groups (such as those derived from amine-terminated unsaturated polyamides disclosed at Patel in Rasayan J. Chem. at http://rasayanjournal.co.in/vol-3/issue-1/20.pdf), polyester-amide groups (such as those derived from hydrophilic polyamides (e.g., polyPEG400diamine succinate)), polycarbonate groups, or combinations thereof.

In certain embodiments the polyethylene glycol groups are present in the silicone copolymer in an amount of at least 40 wt-%, or at least 50 wt-%, based on the total weight of the silicone copolymer. In certain embodiments, the polyethylene glycol groups are present in the silicone copolymer in an amount of up to 75 wt-%, or up to 70 wt-%, based on the total weight of the silicone copolymer.

In certain embodiments, the number average molecular weight of the hydrophilic segments in the silicone copolymer is at least 500 grams/mole, or at least 1,000 grams/mole. In certain embodiments, the number average molecular weight of the hydrophilic segments in the silicone copolymer is less than 20,000 grams/mole, or less than 10,000 grams/mole, or less than 5,000 grams/mole, or less than 1,000 grams/mole.

In certain embodiments, the backbone composition includes no additional hydrophilic segments (other than the PEG-containing hydrophilic segments).

In certain embodiments, the backbone composition further includes additional hydrophilic segments (other than the PEG-containing hydrophilic segments). In certain embodiments, the additional hydrophilic segments include polypropylene glycol (PPG) groups. In certain embodiments, if such additional hydrophilic segments are present, they are present in the silicone copolymer in an amount of up to 10 wt-%, based on the total weight of the silicone copolymer.

In certain embodiments, the hydrophilic segments include ethylene oxide. For example, such hydrophilic segments in the silicone copolymer have a formula according to Formula (I):

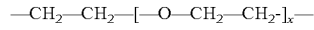

which can be derived from a hydrophilic segment precursor such as the polyether oligomer of Formula (II):

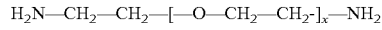

wherein x is an integer ranging from 2 to 60.

In certain embodiments, the hydrophilic segments include block or random copolymers of ethylene oxide and propylene oxide. For example, such hydrophilic segments in the silicone copolymer have a formula according to Formula (III):

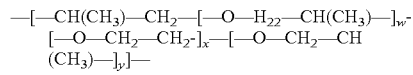

which can be derived from a hydrophilic segment precursor such as the polyether oligomer of Formula (IV):

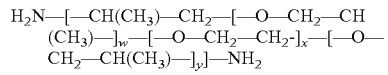

wherein x is an integer ranging from 2 to 60, and the sum of w and y is an integer ranging from 2 to 8.

Such PEG and PPG-PEG-PPG segments and precursors are exemplary. It will be understood by one of skill in the art that other exemplary segments and precursors that include PEG segments only or PEG-PPG-PEG segments are also possible, as are other hydrophilic segment precursors.

In certain embodiments, the hydrophilic segments include ionic groups such as anionic groups selected from carboxylate, sulfate, sulfonate, phosphate, and phosphonate groups; cationic groups selected from quaternary amines and protonated tertiary amines; and zwitterionic groups selected from carboxybetaine, sulfobetaine, and choline. For example, lysine or arginine can be used as a polyamine to incorporate a carboxylate group and dimethyldiethanolamine could be used as a diol to incorporate a quaternary amine. Preferred ionic groups are anionic and zwitterionic.

The silicone segments are present in the silicone copolymer in an amount of at least 5 wt-%, or at least 10 wt-%, based on the total weight of the silicone copolymer. In certain embodiments, the silicone segments are present in the silicone copolymer in an amount of up to 40 wt-%, or up to 30 wt-%, based on the total weight of the silicone copolymer.

In certain embodiments, the number average molecular weight of the silicone segments in the silicone copolymer is at least 1,000 grams/mole, or at least 5,000 grams/mole. In certain embodiments, the number average molecular weight of the silicone segments in the silicone copolymer is less than 20,000 grams/mole, or less than 10,000 grams/mole.

In certain embodiments, the silicone segments in the silicone copolymer includes (—Si(Me)$_2$-O—)$_m$ groups (polydimethylsiloxane or PDMS groups), wherein m is an integer ranging from 2 to 900, in certain embodiments from 10 to 900, in certain embodiments from 50 to 800, or in certain embodiments from 200 to 600. In certain embodiments, the silicone segments in the silicone copolymer have a formula according to Formula (V):

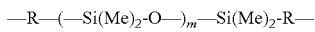

—R—(—Si(Me)$_2$-O—)$_m$—Si(Me)$_2$-R— wherein m is an integer ranging from 2 to 900, and the R groups are independently divalent aliphatic groups. In certain embodiments of Formula V, the R groups are independently (C2-C8)divalent aliphatic groups. In certain embodiments of Formula V, m is an integer ranging from 10 to 900. In certain embodiments of Formula V, m is an integer ranging from 50 to 800. In certain embodiments of Formula V, m is an integer ranging from 200 to 600.

In certain embodiments, the silicone segment precursor for making the silicone segment in the silicone copolymer includes a compound according to the general Formula (VI):

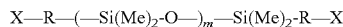

X—R—(—Si(Me)$_2$-O—)$_m$—Si(Me)$_2$-R—X wherein m and the R groups are independently aliphatic groups as defined in Formula V, and X is an active hydrogen containing group selected from —SH, —NHR$^1$, wherein R$^1$ is H, a (C1-C4)alkyl group, or —O—(—CH$_2$—CHR$^2$—O—)$_p$—H, wherein R$^2$ is H or CH$_3$ and p is an integer ranging from 0 to 100, or p is an integer ranging from 0 to 30.

The reinforcing segments are present in the silicone copolymer in an amount of at least 5 wt-%, based on the total weight of the silicone copolymer. In certain embodiments, the reinforcing segments are present in the silicone copolymer in an amount of up to 30 wt-%, or up to 20 wt-%, based on the total weight of the silicone copolymer.

The reinforcing segments are derived from the reaction of one or more chain extenders with one or more multi-functional isocyanates, multi-functional carboxylic acids, multi-functional anhydrides, multi-functional esters, and/or multi-functional acid halides.

In certain embodiments, the one or more multi-functional isocyanates are selected from the group of aromatic, cycloaliphatic, aliphatic, and araliphatic multi-functional isocyanates, used either alone or in mixtures of two or more. In certain embodiments, the one or more multi-functional isocyanates are selected from the group of aromatic diisocyanates, cycloaliphatic diisocyanates, aliphatic diisocyanates, and araliphatic diisocyanates, used either alone or in mixtures of two or more.

In certain embodiments, the one or more multi-functional isocyanates include an aromatic diisocyanate. In certain embodiments, the aromatic diisocyanate is selected from the group of 2,4-toluene diisocyanate, 2,6-toluene diisocyanate, a dimer of toluene diisocyanate (available under the trademark DESMODUR TT from Miles Coating Division), diphenylmethane 4,4'-diisocyanate (MDI), 1,5-diisocyanato-naphthalene, 1,4-phenylene diisocyanate, 1,3-phenylene diisocyanate, and a mixture thereof.

In certain embodiments, the one or more multi-functional isocyanates include a cycloaliphatic diisocyanate. In certain embodiments, the cycloaliphatic diisocyanate is selected from the group of dicyclohexylmethylene diisocyanate (H$_{12}$MDI, commercially available as DESMODUR W from Miles Coating Division), isophorone diisocyanate (IPDI), 1,4-cyclohexane diisocyanate (CHDI), 1,4-cyclohexanebis (methylene isocyanate) (BDI), 1,3-bis(isocyanatomethyl) cyclohexane (H$_6$XDI), and a mixture thereof. In certain embodiments, the cycloaliphatic diisocyanate is selected from IPDI, H$_{12}$MDI, and a mixture thereof.

In certain embodiments, the one or more multi-functional isocyanates include an aliphatic diisocyanate. In certain embodiments, the aliphatic diisocyanate is selected from the group of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimeryl diisocyanate, urea of hexamethyl diisocyanate, and a mixture thereof.

In certain embodiments, the one or more multi-functional isocyanates include an araliphatic diisocyanate. In certain embodiments, the araliphatic diisocyanate is selected from the group of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, and a mixture thereof.

In certain embodiments, the one or more multi-functional isocyanates are selected from the group of isophorone diisocyanate, toluene diisocyanate, dicyclohexylmethane 4,4'-diisocyanate, 1,4-cyclohexane diisocyanate, m-tetramethyl xylylene diisocyanate, p-tetramethyl xylylene diisocyanate, and a mixture thereof.

In certain embodiments, the one or more multi-functional carboxylic acids are selected from the group of oxalic acid, malonic acid, succinic acid, glutaric acid, 2,2-dimethyl glutaric acid, adipic acid, pimelic acid, suberic acid, azelaic acid, 1,3,5-trimethyl-1,3,5-cyclohexanetricarboxylic acid, 1,2,3-propanetricarboxylic acid, 1,2,3,4-cyclopentanetetracarboxylic acid, 1,2,4,5-benzenetetracarboxylic acid, 1,2,3,4-butanetetracarboxylic acid, 1,2,3,4,5,6-cyclohexanehexacarboxylic acid, terephthalic acid, benzophenonedicarboxylic acid, diphenylmethane 4,4'-dicarboxylate, and mixtures thereof.

In certain embodiments, the one or more multi-functional anhydrides are selected from the group of 1,2,4,5-benzenetetracarboxylic dianhydride, 3,4,9,10-perylene tetracarboxylic dianhydride, 3,3',4,4'-benzophenonetetracarboxylic dianhydride, 1,2,7,8-naphthalenetetracarboxylic dianhydride, pyromellitic dianhydrid, 2,3,4,5-tetrahydrofurantetracarboxylic acid dianhydride, mellitic trianhydride, 1,2,3,4-cyclobutanetetracarboxylic dianhydride, bicyclo[2,2,2]oct-7-ene-2,3,5,6-tetracarboxylic dianhydride, cyclopentanetetracarboxylic dianhydride, ethylenediaminetetraacetic dianhydride, and diethylenetriaminepentaacetic dianhydride, and mixtures thereof.

In certain embodiments, the one or more multi-functional esters are selected from the group of those active esters described by Greenstein and Winitz in "Chemistry of the Amino Acids," vol. 2, John Wiley and Sons, Inc. (1961). Preferred direactive active ester compounds include diphenyl succinate, bis(p-nitrophenyl) succinate, bis(cyanoethyl) glutarate, and di-S-phenyl dithiosuccinate, and mixtures thereof.

In certain embodiments, the one or more multi-functional acid halides are selected from the group of aromatic and aliphatic di- and tri-carboxylic acid halides including d-camphoric diacid chloride, 4-p-(o-chlorocarbonylbenzoyl)phenyl]butyryl chloride, furan-3,5-dicarboxylic chloride, fumaryl chloride, glutaryl chloride, succinyl chloride, sebacoyl chloride, isophthaloyl chloride, terephthaloyl chloride, 4-bromoisophthaloyl chloride; diglycolic diacid chloride, 1,1-cyclohexanediacetyl chloride, 2,2-dimethylglutaryl chloride, thioglycolic acid dichloride, nitrilotriacetyl chloride, beta-methylcarballylic acid trichloride, hexadecanedioic acid dichloride, malonic acid dichloride, acetone dicarboxylic acid dichloride, oxydiacetyl chloride benzene-1,3, 5-tricarbonyl chloride, 4-chlorocarbonylphenoxyacetyl chloride, homophthaloyl chloride, 4,4'-diphenyletherdicarboxylic acid dichloride, 4,4'-diphenylthioetherdicarboxylic acid dichloride, 4,4'-diphenylsulfonedicarboxylic acid dichloride, acetylene dicarboxylic acid dichloride, cyclohexane-1,4-dicarboxylic acid dichloride, trans-3,6-endomethylene-1,2,3,6-tetrahydrophthaloyl chloride, 4,4'-dithiodibutyryl chloride, diphenylmethane-4,4'-bis(oxyacetyl) chloride, N-(4-chlorocarbonylphenyl)anthranyloyl chloride, 1,3-benzenebisoxyacetyl chloride, pyridine-3,5-dicarboxylic acid dichloride, pyridine-2,5-dicarboxylic acid dichloride, pyridine-2,4-dicarboxylic acid dichloride, pyrazine-2,3-dicarboxylic acid dichloride, and pyridine-2,6-dicarboxylic acid dichloride, ethyleneglycol bis-4-chlorocarbonylphenyl)ether, diethyleneglycol bis-4-chlorocarbonylphenyl)ether, bis-4-chlorocarbonyl-2-tolyl) thioether, N-chlorocarbonylmethyl-N-methylglutaramic acid chloride, and mixtures thereof.

Examples of other multi-functional esters, multi-functional acid halides, and multi-functional anhydrides can be found, for example, in U.S. Pat. No. 4,713,446.

In certain embodiments, the chain extenders are multi-ols or multi-amines. In certain embodiments, the chain extenders are (C3-C24)multi-ols or (C3-C24)multi-amines.

In certain embodiments, the chain extenders are compounds with the general Formula (VII):

HZ-D-ZH wherein Z is O or NH, and D is an branched or straight chain or cyclic alkylene group, arylene group, or combination thereof. In certain embodiments, D is a (C3-C12)alkylene group. In certain embodiments D is cycloaliphatic, araliphatic, or aromatic having 6 to 24 carbon atoms. In certain embodiments, the chain extenders are chain-extending (C3-C24)diamines and/or (C3-C24)diols. In certain embodiments, the chain extenders are chain-extending (C3-C12) diamines and/or (C3-C12)diols.

In certain embodiments, the one or more chain-extending (C3-C12)diamines are selected from the group of hexamethylene diamine (HMDA), xylylene diamine, 1,3-di(4-piperidyl)propane (DIPIP), N-2-aminoethyl propylmethyldimethoxysilane (DAS), 1,3-diaminopentane (DAMP), 1,4-diaminopentane, 4,4'-methylenebiscyclohexylamine (MBCH), piperazine, lysine, piperidyl propane, and a mixture thereof. In certain embodiments, the one or more chain-extending (C3-C12)diamines are selected from the group of DAMP, HMDA, and a mixture thereof.

In certain embodiments, the one or more chain-extending (C3-C12)diols are selected from the group of 2-ethyl-1,3-hexanediol (PEP diol), 1,2-propane diol, 2-ethyl-2-butyl 1,3 propane diol (BEP diol), and 2,2,4-trimethyl-1,3-pentane diol (TMP diol), and a mixture thereof.

Methods of making silicone copolymers of the present disclosure are well known to one of skill in the art. Examples of such methods are disclosed in the Examples Section of the present disclosure.

For example, in certain embodiments of the copolymer of the present disclosure, the silicone segments are derived from silicone diamines, the hydrophilic segments are derived from JEFFAMINE amine-terminated polyethers, and the reinforcing segments are derived from relatively short chain diamines such as diaminomethylpentane.

In certain embodiments, copolymers can be prepared by condensation reactions of carboxy-terminated silicones with short-chained diamines, or by condensation reactions of amino-terminated silicones with short-chained dicarboxylic acids. Alternatively, these block copolymers can be polydiorganosiloxane polyoxamide block copolymers having oxylated soft segments. Polydiorganosiloxane polyamide copolymers can be linear or branched. As used herein, the term "branched" is used to refer to a polymer chain having branch points that connect three or more chain segments. Examples of branched polymers include long chains having occasional and usually short branches including the same repeat units as the main chain (nominally termed a branched polymer). Branched polydiorganosiloxane polyamide block copolymers having oxylated soft segments can optionally form cross-linked networks. Specific examples of copolymers are disclosed in U.S. Pat. No. 8,063,166.

In one embodiment, a method of making a copolymer composition involves forming a silicone copolymer by combining components including: a silicone segment precursor in an amount of 5 wt-% to 40 wt-%, based on the total weight of the silicone copolymer; a hydrophilic segment precursor in an amount of 40 wt-% to 75 wt-%, based on the total weight of the silicone copolymer; and one or more chain extenders and one or more multi-functional isocyanates, multi-functional carboxylic acids, multi-functional anhydrides, multi-functional esters, and/or multi-functional acid halides in amounts sufficient to form reinforcing segments in an amount of 5 wt-% to 30 wt-%, based on the total weight of the silicone copolymer, wherein the silicone segments, hydrophilic segments, and reinforcing segments are connected through urea, urethane, amide, and/or oxamide linkages. The precursors are selected in relative amounts such that the hydrophilic segments and the reinforcing segments are present in a weight ratio of 1.8:1 to 8:1, and the hydrophilic segments and the silicone segments are present in a weight ratio of 1.3:1 to 4.5:1.

In one embodiment, a method of making a copolymer composition involves forming a silicone-polyurea (SPU) copolymer by combining components including: a silicone segment precursor in an amount of 5 wt-% to 40 wt-%, based on the total weight of the silicone copolymer; a hydrophilic segment precursor comprising polyethylene oxide (PEO) groups in an amount of 40 wt-% to 75 wt-%, based on the total weight of the silicone copolymer; and one or more diisocyanates and one or more chain-extending (C3-C12) diamines in amounts sufficient to form reinforcing segments in an amount of 5 wt-% to 30 wt-%, based on the total weight of the silicone copolymer, wherein the silicone segments, hydrophilic segments, and reinforcing segments are connected through urea segments. The precursors are selected in relative amounts such that the PEO-containing hydrophilic segments and the reinforcing segments are present in a weight ratio of 1.8:1 to 8:1, and the PEO-containing hydrophilic segments and the silicone segments are present in a weight ratio of 1.3:1 to 4.5:1.

Optional Additives

Compositions of the present disclosure that include silicone copolymers may further include one or more optional additives to provide one or more various properties.

For example, for enhanced hydrophilicity, a hydrophilic polymer (which may be natural or synthetic) may be used. In certain embodiments, the silicone copolymer and the hydrophilic polymer forms an interpenetrating network.

Suitable optional hydrophilic polymers are either soluble in distilled water at 23° C. at 1% by weight or swells (i.e., absorbs) in water to greater than 50% by weight water (i.e., 1 gram of polymer absorbs/dissolves in 1 gram of distilled water at 23° C. to form a transparent, often very viscous, solution in less than 8 hours). Typically, such hydrophilic polymers have a weight average molecular weight of greater than 10,000, or greater than 25,000, or greater than 50,000, or greater than 100,000, or greater than 200,000 g/mole.

In certain embodiments, the hydrophilic polymer is selected from the group of an anionic polymer, a neutral polymer, a zwitterionic polymer, a cationic polymer, and a combination thereof. In certain embodiments, the hydrophilic polymer is selected from the group of an anionic polymer, a neutral polymer, a zwitterionic polymer, and a combination thereof.

In certain embodiments, the hydrophilic polymer is selected from the group of hyaluronic acid, a polyvinylpyrrolidone, a poly(meth)acrylate, a cellulose derivative, a polypeptide, a starch, a starch derivative, a polyvinylalcohol, a poly(C2-C4)alkylene oxide, a polyurethane hydrogel, a polycarboxybetaine, a polysulfobetaine, a polymer with multiple pendant phophorylcholine groups, such as homo- and co-polymers of 2 methacryloyloxyethyl phosphorylcholine, and a mixture thereof.

In certain embodiments, the hydrophilic polymer is selected from the group of gums, such as acacia, agarose, alginic acid, sodium alginate and other alginic acid derivatives, carrageenan, gelatin, gellan, guar gum, hakea gum, karaya gum, and locust bean gum, among others; chitosan and chitosan derivatives; hyaluronic acid, pectin, and other polysaccharides; gelatin, polyvinylalcohol, polyvinylpyrrolidone, polycarbophil, polyethylene oxide polymers, and pullulan, among others. Cellulose derivatives such as ethyl cellulose, cellulose acetate, hydroxyethyl cellulose, hydroxypropylcellulose, hydroxypropylmethylcellulose, methylcellulose, methylhydroxyethylcellulose, and sodium carboxymethyl cellulose, among others; poly(acrylic acid)-based polymers, such as polyacrylates, poly(methylvinyle-ther-co-methacrylic acid), poly(acrylic acid-co-ethylhexylacrylate), poly(acrylic acid-co-acrylamide), poly(acrylic acid-co-butylacrylate), poly(acrylic acid-co-methyl methacrylate), poly (2-hydroxyethyl methacrylate), polymethacrylates, poly(alkylcyanoacrylate) and other cyanoacrylates, poly(isohexycyanoacrylate), poly(isobutylcyanoacrylate), and hydroxyethyl methacrylate, and combinations thereof.

In certain embodiments, the ratio of the silicone copolymer to the hydrophilic polymer is within a range of 1:5 to 5:1 (e.g., at a ratio of 1:1).

Copolymer compositions of the present disclosure are suitable for multiple medical and personal care applications (e.g., tissue contacting materials, wound dressings, absorbent pads, and catamenial devices). For such applications, sterilization is required to prevent bacterial contamination and to enhance shelf life. Sterilization may occur upon exposure to steam, a chemical sterilant such as ethylene oxide or hydrogen peroxide, gamma irradiation, or electron beam.

Gamma irradiation and electron beam sterilization are often the preferred methods of sterilization; however, some silicone copolymers, particularly those with PEG-containing hydrophilic segments, may undergo degradation under these conditions. Such degradation products can leach out of the materials and cause undesirable results. Thus, in certain embodiments, copolymer compositions of the present disclosure may include an antioxidant that prevents silicone copolymer breakdown and does not leach out of the copolymer composition.

In certain embodiments, the antioxidant is selected from the group of hindered phenols, hindered amines, phosphites, and combinations thereof. Examples include butylated hydroxyanisole (BHA), butylated hydroxytoluene (BHT), ascorbyl palmitate, propyl 3,4,5-trihydroxybenzoate (propyl gallate), a tocopherol, octyl 3,4,5-trihydroxybenzoate (octyl gallate), dodecyl 3,4,5-trihydroxybenzoate (dodecyl gallate E312), sodium ascorbate, a sterically hindered primary phenol (e.g., IRGANOX 1010 and IRGANOX 1076), a sulfur-containing primary phenol (e.g., IRGANOX 1035), and a mixture thereof. Alternatively or additionally, a polymer-bound antioxidant may be used. For example, alcohol functional antioxidants, such as that available under the trade name MILLIGUARD AOX from Milliken, can be reacted with excess isocyanate to make it isocyanate functional, which can be reacted into the silicone copolymer.

In certain embodiments, a copolymer composition includes at least 0.25 wt-% of an antioxidant, based on the total weight of the copolymer composition. When used, the antioxidant may be used in an amount that does not leach out of the copolymer composition per Analysis of Polymer Leachables (in 0.9% saline solution for 24 hours at room temperature) in the Examples Section. For example, in certain embodiments, this amount is up to 5 wt-% of an antioxidant, based on the total weight of the copolymer composition.

In certain embodiments, copolymer compositions of the present disclosure may include an active agent. In certain embodiments, the active agent is selected from the group of an antimicrobial agent, an analgesic, a healing factor, a hemostatic agent, an antiadhesion agent, a vitamin, a growth factor, a nutrient, nitric oxide, a nitric oxide releasing compound or system, nitroglycerin, an antiinflammatory drug (both steroidal and nonsteroidal), an antibacterial, an antiprotazoal, an antifungal, a vasodilator, an enzyme inhibitor, an antiviral, an immunomodulatory, a local anesthetic, a peptide hormone, a hemostatic, and a mixture thereof. Other actives can be used to accelerate wound healing, reduce inflammation, reduce bleeding, and the like.

The antimicrobial agent may be used to kill bacteria at a wound edge. Suitable antimicrobials include those disclosed in U.S. Pat. No. 8,198,326 and U.S. Patent Application Publication Nos. 2006/0051384, 2006/0051385, and 2005/0089539, as well as non-leachable antimicrobials such as antimicrobial silanes (e.g., octadecyldimethylpropyltri-alkoxysilanes, and polymeric antimicrobials such as those disclosed in U.S. Patent Application Publication No. 2015/0024019), as well as other known antimicrobials.

Exemplary steroidal antiinflammatory drugs include hydrocortisone, prednisolone, and triamcinolone. Exemplary nonsteroidal drugs include naproxen and piroxicam. Exemplary antibacterials include penicillins such as penicillin V, cephalosporins such as cephalexin, erythromycin, tetracycline, gentamycin, sulfathiazole, nitrofurantoin, and quinolones such as norfloxacin, flumequine, and ibafloxacin. Exemplary antiprotazoals include metronidazole.

Exemplary antifungals include, nystatin. Exemplary enzyme inhibitors include collagenase inhibitors, protease inhibitors, elastase inhibitors, lipoxygenase inhibitors. Exemplary antivirals and/or immunomodulators include 1-isobutyl-1H-imidazo[4,5-c]quinolin-4-amine, 1-(2-hydroxy-2-methylpropyl)-1H-imidazo[4,5-c]quinolin-4-amine, and other compounds disclosed in U.S. Pat. No. 4,689,338 (e.g., acyclovir). Exemplary local anesthetics include benzocaine and propofol. Exemplary peptide hormones include human or animal growth hormones, including luteinizing hormone-releasing hormone (LHRH)). Exemplary enzymes include papain, lysozyme, collagenase, and dextranase.

In certain embodiments, a copolymer composition includes at least 0.05 wt-%, or at least 0.1 wt-%, or at least 0.25 wt-%, of an active agent, based on the total weight of the copolymer composition. In certain embodiments, a copolymer composition includes up to 10 wt-%, or up to 5 wt-%, of an active agent, based on the total weight of the copolymer composition.

In certain embodiments, copolymer compositions of the present disclosure may include an elutable surfactant. In certain embodiments, the elutable surfactant is selected from the group of mono- or di-((C6-C20)alkyl or (C6-C20)alkylene)esters of glycerin or propylene glycol, a glycerin or propylene glycol ((C6-C20)alkyl or (C6-C20)alkylene) ether, alkylpolyglucosides, alkyl esters of sucrose, polyethoxylated (C8-C20)alkyl alcohols or (C8-C20)alkylene alcohols or castor oil, phospholipids (such as lecithin, phosphatidylcholine, phosphatidylethanolamine, phosphatidylinositol, phosphatidylserine, and phosphatidic acid, 1,2-distearoyl-sn-glycero-3-phosphocholine, 1,2-dimyristoyl-sn-glycero-3-(phosphor-s-(1-glycerol)), polysorbates (such as polysorbate 20, 40, or 80 such as TWEEN 20), di-(C6-C20)alkyl sulfosuccinate, and a mixture thereof.

In certain embodiments, a copolymer composition includes at least 0.05 wt-%, or at least 0.1 wt-%, or at least 0.2 wt-%, or at least 0.5, or at least 1 wt-%, of an elutable surfactant, based on the total weight of the copolymer composition. In certain embodiments, a copolymer composition includes up to 10 wt-%, or up to 5 wt-%, of an elutable surfactant, based on the total weight of the copolymer composition.

In certain embodiments, copolymer compositions of the present disclosure may include
a surfactant carrier. A surfactant carrier is a vehicle that is a liquid at 23° C. in which the surfactant is soluble to at least 1 wt-%, based on the weight of the surfactant and surfactant carrier. Preferred surfactant carriers can solubilize at least 10 wt-% surfactant after heating to 100° C. with mixing for 30 minutes and cooling to 23° C.

In certain embodiments, surfactant carriers include polyalkylene oxides, such as polyethylene glycol, polypropylene glycol, random and block copolymers of ethylene oxide and propylene oxide, polyhydric alcohols, such as propylene glycol, glycerin, polyglycerin, and the like. The polyalkylene oxides may be linear or branched depending on the initiating polyol. For example, a polyethylene glycol initiated using ethylene glycol would be linear but one initiated with glycerin, trimethylolpropane, or pentaerythritol would be branched.

Surfactant carriers also may include relatively low molecular weight (less than 1000 daltons and preferably less than 750 daltons) esters of polyhydric alcohols, such as esters of glycerin or propylene glycol, with (C1-C18)alkyl carboxylates optionally substituted with hydroxyl groups including, for example, triglycerides, such as triacetin, glyceryl caprylate/caprate, castor oil, and the like, propylene glycol monolaurate, propylene glycol dioctanoate, and the like. (C2-C18)Esters of polycarboxylic acids having a molecular weight less than 500 also are suitable, including esters of citric acid, malic acid, succinic acid, maleic acid, malonic acid, and the like. Examples of these surfactant carriers include acetyl tributyl citrate, tributyl citrate, triethyl citrate, diethyl citrate, diethyl malate, and the like. Various mixtures of surfactant carriers may be used if desired.

The surfactant carrier functions to increase the amount of surfactant at the surface of the copolymer composition. This is easily determined by making otherwise identical samples with and without the carrier and checking the wettability with sterile 0.9% NaCl in water by placing a 3 microliter drop on the surface of an article treated with the copolymer such as a fabric (e.g., surgical gauze) or film and measuring the time for the drop to absorb or the contact angle as a function of time. Porous fabric samples containing effective carriers and surfactants will absorb the saline much faster. Film samples treated with the copolymer and surfactant and/or carrier will show significantly lower contact angles compared to untreated samples when measured 60 seconds after placing the saline on the substrate. In certain embodiments, a copolymer composition includes at least 0.2 wt-%, or at least 0.5 wt-%, or at least 1 wt-%, or at least 5 wt-%, of a surfactant carrier, based on the total weight of the copolymer composition. In certain embodiments, a copolymer composition includes up to 20 wt-%, or up to 10 wt-%, of a surfactant carrier, based on the total weight of the copolymer composition.

Alternatively, the surfactant can be coated onto the surface of the copolymer by any suitable means including dip coating, spray coating, slot coating, gravure coating, contact or non-contact printing, and the like.

Optional additives used in the copolymer compositions of the present disclosure, along with impurities, may or may not be elutable/leachable.

In certain embodiments, a copolymer composition may be designed to elute one or more optional additives out of the composition for a desired effect. For example, a copolymer composition may elute during use at least a portion of a hydrophilic polymer, an elutable surfactant, and/or an active agent, to increase the wettability and/or activity of the copolymer composition.

In certain embodiments, a copolymer composition may be designed to leach little or no material (i.e., leachates, leachable compounds, or leachables). Such leachates may include small molecule impurities, macromolecule leachates, or antioxidants. In such embodiments, less than 10 wt-%, or less than 5 wt-%, leachates are leached out of a copolymer composition under aqueous extraction in saline for 24 hours. Typically, leachability may be evaluated using a film of a copolymer composition, which is soaked in an aqueous saline solution for 24 hours. Leachates in the extract may be determined and measured using HPLC. This is particularly important for cytotoxic leachates. Cell viability can be determined as illustrated in the Examples Section.

The resultant materials are useful for tissue-friendly, non-cytotoxic applications during a surgery (e.g., in a lap sponge, for example) and wound care. For these applications, small molecule leachates are not desirable and anything that does leach out of these materials must be non-cytotoxic.

Articles

The copolymer compositions of the present disclosure can be used in a variety of articles.

For example, a copolymer composition of the present disclosure may be in the form of a mesh, a monofilament or multifilament yarn, a woven web, a nonwoven web, a film (which may be a structured film such as a microreplicated film, a microprofile film, an extruded film, or an embossed film, etc.), a foam, or a combination thereof.

Alternatively, a copolymer composition of the present disclosure may form a coating on a substrate. Such coating may be a continuous coating or a discontinuous coating (e.g., pattern coating in the form of stripes, diamonds, dots, etc.). The substrate on which such coating is disposed may be a mesh, a monofilament or multifilament yarn, a woven web, a nonwoven web, a film, a foam, or a combination thereof.

Articles for which the copolymer compositions of the present disclosure are particularly suited (whether as a coating on an article or as the body of an article) include disposable surgical wound edge protectors, surgical retractors, as well as surgical sponges. Such sponges (e.g., absorbent cotton gauze, foams, and nonwovens in various shapes and sizes) include, for example, atraumatic lint-free sponges, ophthalmic sponges, dissecting sponges, tonsil and adenoid sponges, surgical gauze sponges, sterile puffs, dental rolls, neurology sponges, laparotomy gauze sponges, and the like. A particularly desirable coated substrate is a laparotomy ("lap") sponge made of woven cotton gauze.

Copolymer compositions of the present disclosure may also be used in or on other medical devices. Exemplary medical devices include a wound dressing, wound absorbent, wound contact layer, urinary or vascular access catheter, endotracheal tube, nasogastric tube, dialysis catheters and tubing stents, pacemaker shells, heart valves, orthopedic implants such as hips, knees, shoulders, etc., periodontal implants, orthodontic brackets and other orthodontic appliances, dentures, dental crowns, contact lenses, intraocular lenses, soft tissue implants (breast implants, penile implants, facial and hand implants, etc.), surgical tools, sutures including degradable sutures, cochlear implants, tympanoplasty tubes, shunts including shunts for hydrocephalus, post-surgical drain tubes and drain devices, and other implantable devices, and other indwelling devices.

ILLUSTRATIVE EMBODIMENTS

The following embodiments are intended to be illustrative of the present disclosure and not limiting.

Embodiment 1 is a copolymer composition comprising a silicone copolymer having a backbone composition comprising: silicone segments in an amount of 5 wt-% to 40 wt-%, based on the total weight of the copolymer; hydrophilic segments in an amount of 40 wt-% to 75 wt-%, based on the total weight of the copolymer; and reinforcing segments in an amount of 5 wt-% to 30 wt-%, based on the total weight of the copolymer, wherein the reinforcing segments are derived from the reaction of one or more chain extenders with one or more multi-functional isocyanates, multi-functional carboxylic acids, multi-functional anhydrides, multi-functional esters, and/or multi-functional acid halides. The silicone segments, hydrophilic segments, and reinforcing segments are connected through urea, urethane, amide, and/or oxamide linkages, and in certain embodiments, the silicone segments, hydrophilic segments, and reinforcing segments are connected through urea linkages optionally with urethane, amide, and/or oxamide linkages, and in some embodiments, urea linkages only. The hydrophilic segments and the reinforcing segments are present in a weight ratio of 1.8:1 to 8:1; and the hydrophilic segments and the silicone segments are present in a weight ratio of 1.3:1 to 4.5:1.

Embodiment 2 is the copolymer composition of embodiment 1 wherein the hydrophilic segments comprise polyethylene glycol groups, polypropylene glycol groups, polybutylene oxide groups, polyester groups, amine-terminated polyester groups, amine-terminated polyamide groups, poly-ester-amide groups, polycarbonate groups, or combinations thereof (e.g., random poly(C2-C4)alkylene oxide groups).

Embodiment 3 is the copolymer composition of embodiment 2 wherein the hydrophilic segments comprise polyethylene glycol groups in an amount of 40 wt-% to 75 wt-%, based on the total weight of the copolymer.

Embodiment 4 is the copolymer composition of embodiment 3 wherein the backbone composition comprises additional hydrophilic segments in an amount of up to 10 wt-%, based on the total weight of the copolymer.

Embodiment 5 is the copolymer composition of embodiment 4 wherein the additional hydrophilic segments comprise polypropylene glycol groups.

Embodiment 6 is the copolymer composition of embodiment 3 wherein the backbone composition comprises no additional hydrophilic segments.

Embodiment 7 is the copolymer composition of any of embodiments 1 to 6 wherein the silicone copolymer is a random copolymer wherein the silicone segments, hydrophilic segments, and reinforcing segments are connected randomly through urea, urethane, amide, and/or oxamide linkages. In certain embodiments, the silicone segments, hydrophilic segments, and reinforcing segments are connected randomly through urea linkages optionally with urethane, amide, and/or oxamide linkages, and in some embodiments, urea linkages only.

Embodiment 8 is the copolymer composition of any of embodiments 1 to 7 wherein the silicone copolymer has a backbone composition comprising silicone segments in an amount of 10 wt-% to 30 wt-%, based on the total weight of the silicone copolymer.

Embodiment 9 is the copolymer composition of any of embodiments 1 to 7 wherein the silicone copolymer has a backbone composition comprising hydrophilic segments in an amount of 50 wt-% to 70 wt-%, based on the total weight of the silicone copolymer.

Embodiment 10 is the copolymer composition of any of embodiments 1 to 9 wherein the silicone copolymer has a backbone composition comprising reinforcing segments in an amount of 5 wt-% to 20 wt-%, based on the total weight of the silicone copolymer.

Embodiment 11 is the copolymer composition of any of embodiments 1 to 10 wherein the number average molecular weight of the silicone segments is at least 1,000 grams/mole.

Embodiment 12 is the copolymer composition of embodiment 11 wherein the number average molecular weight of the silicone segments is at least 5,000 grams/mole.

Embodiment 13 is the copolymer composition of embodiment 11 or 12 wherein the number average molecular weight of the silicone segments is less than 20,000 grams/mole.

Embodiment 14 is the copolymer composition of embodiment 13 wherein the number average molecular weight of the silicone segments is less than 10,000 grams/mole.

Embodiment 15 is the copolymer composition of any of embodiments 1 to 14 wherein the number average molecular weight of the hydrophilic segments is at least 500 grams/mole, or at least 1,000 grams/mole.

Embodiment 16 is the copolymer composition of embodiment 15 wherein the number average molecular weight of the hydrophilic segments is less than 20,000 grams/mole.

Embodiment 17 is the copolymer composition of embodiment 16 wherein the number average molecular weight of the hydrophilic segments is less than 10,000 grams/mole.

Embodiment 18 is the copolymer composition of embodiment 17 wherein the number average molecular weight of the hydrophilic segments is less than 5,000 grams/mole.

Embodiment 19 is the copolymer composition of any of embodiments 1 to 18 wherein the silicone segments have a formula according to Formula V:

—R—(—Si(Me)$_2$-O—)$_m$—Si(Me)$_2$-R— wherein m is an integer ranging from 2 to 900, and the R groups are independently divalent aliphatic groups (such as (C2-C8)divalent aliphatic groups).

Embodiment 20 is the copolymer composition of embodiment 19 wherein m is an integer ranging from 10 to 900, or from 50 to 800, or from 200 to 600.

Embodiment 21 is the copolymer composition of any of embodiments 1 to 20 wherein hydrophilic segments have a formula according to Formula I or Formula III:

—CH$_2$—CH$_2$—[—O—CH$_2$—CH$_2$-]$_x$- (I)

—[—CH(CH$_3$)—CH$_2$—[—O—CH$_2$—CH(CH$_3$)—]$_w$
—[—O—CH$_2$—CH$_2$-]$_x$—[—O—CH$_2$—CH
(CH$_3$)—]$_y$]- (III)

wherein x is an integer ranging from 2 to 60, and the sum of w and y is an integer ranging from 2 to 8.

Embodiment 22 is the copolymer composition of any of embodiments 1 to 21 wherein the one or more multi-functional isocyanates are selected from the group of aromatic multi-functional isocyanates, cycloaliphatic multi-functional isocyanates, aliphatic multi-functional isocyanates, and araliphatic multi-functional isocyanates, used either alone or in mixtures of two or more.

Embodiment 23 is the copolymer composition of embodiment 22 wherein the one or more multi-functional isocyanates are selected from the group of aromatic diisocyanates, cycloaliphatic diisocyanates, aliphatic diisocyanates, and araliphatic diisocyanates, used either alone or in mixtures of two or more.

Embodiment 24 is the copolymer composition of embodiment 23 wherein the one or more multi-functional isocyanates comprise an aromatic diisocyanate.

Embodiment 25 is the copolymer composition of embodiment 24 wherein the aromatic diisocyanate is selected from the group of 2,4-toluene diisocyanate, 2,6-toluene diisocyanate, a dimer of toluene diisocyanate (available under the trademark DESMODUR TT from Miles Coating Division), diphenylmethane 4,4'-diisocyanate (MDI), 1,5-diisocyanato-naphthalene, 1,4-phenylene diisocyanate, 1,3-phenylene diisocyanate, and a mixture thereof.

Embodiment 26 is the copolymer composition of embodiment 23 wherein the one or more multi-functional isocyanates comprise a cycloaliphatic diisocyanate.

Embodiment 27 is the copolymer composition of embodiment 26 wherein the cycloaliphatic diisocyanate is selected from the group of dicyclohexylmethane diisocyanate (H$_{12}$MDI, commercially available as DESMODUR W from Miles Coating Division), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane (H$_6$XDI), and a mixture thereof.

Embodiment 28 is the copolymer composition of embodiment 27 wherein the cycloaliphatic diisocyanate is selected from IPDI, H$_{12}$MDI, and a mixture thereof.

Embodiment 29 is the copolymer composition of embodiment 23 wherein the one or more multi-functional isocyanates comprise an aliphatic diisocyanate.

Embodiment 30 is the copolymer composition of embodiment 29 wherein the aliphatic diisocyanate is selected from the group of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimeryl diisocyanate, urea of hexamethyl diisocyanate, and a mixture thereof.

Embodiment 31 is the copolymer composition of embodiment 23 wherein the one or more multi-functional isocyanates comprise an araliphatic diisocyanate.

Embodiment 32 is the copolymer composition of embodiment 31 wherein the araliphatic diisocyanate is selected from the group of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, and a mixture thereof.

Embodiment 33 is the copolymer composition of any of embodiments 23 to 32 wherein the one or more multi-functional isocyanates are selected from the group of isophorone diisocyanate, toluene diisocyanate, dicyclohexylmethane 4,4'-diisocyanate, 1,4-cyclohexane diisocyanate, m-tetramethyl xylylene diisocyanate, p-tetramethyl xylylene diisocyanate, and a mixture thereof.

Embodiment 34 is the copolymer composition of any of embodiments 1 to 33 wherein the one or more chain extenders comprise one or more chain-extending (C3-C24)multi-ols or (C3-C24)multi-amines. In some embodiments, the chain extenders are one or more chain-extending (C3-C12) multi-ols or (C3-C12)multi-amines.

Embodiment 35 is the copolymer composition of embodiment 34 wherein the one or more chain extenders comprise (C3-C12)diamines selected from the group of hexamethylene diamine (HMDA), xylylene diamine, 1,3-di(4-piperidyl) propane (DIPIP), N-2-aminoethyl propylmethyldimethoxysilane (DAS), 1,3-diaminopentane (DAMP), 1,4-diaminopentane, 4,4'-methylenebiscyclohexylamine, piperazine, lysine, piperidyl propane, and a mixture thereof.

Embodiment 36 is the copolymer composition of embodiment 35 wherein the one or more chain extenders comprise (C3-C12)diols selected from the group of 2-ethyl-1,3-hexanediol (PEP diol), 1,2-propane diol, 2-ethyl-2-butyl 1,3 propane diol (BEP diol), and 2,2,4-trimethyl-1,3-pentane diol (TMP diol), and a mixture thereof.

Embodiment 37 is the copolymer composition of any of embodiments 1 to 36 further comprising a hydrophilic polymer. In certain embodiments, the silicone copolymer and the hydrophilic polymer forms an interpenetrating network.

Embodiment 38 is the copolymer composition of embodiment 37 wherein the hydrophilic polymer is selected from the group of an anionic polymer, a neutral polymer, a cationic polymer, a zwitterionic polymer, and a combination thereof.

Embodiment 39 is the copolymer composition of embodiment 37 or 38 wherein the hydrophilic polymer is selected from the group of hyaluronic acid, a polyvinylpyrrolidone, a poly(meth)acrylate, a cellulose derivative, a polypeptide, a starch, a starch derivative, a polyvinylalcohol, a poly(C2-C4)alkylene oxide, a polyurethane hydrogel, a polycarboxybetaine, a polysulfobetaine, a polymer with multiple pendant phophorylcholine groups such as homo and copolymers of 2 methacryloyloxyethyl phosphorylcholine, and a mixture thereof. In certain embodiments, the hydrophilic polymer is selected from the group of gums, such as acacia, agarose, alginic acid, sodium alginate and other alginic acid derivatives, carrageenan, gelatin, gellan, guar gum, hakea gum, karaya gum, and locust bean gum, among others; chitosan and chitosan derivatives; hyaluronic acid, pectin, and other polysaccharides; gelatin, polyvinylalcohol, polyvinylpyrrolidone, polycarbophil, polyethylene oxide polymers, and pullulan, among others. Cellulose derivatives such as ethyl cellulose, cellulose acetate, hydroxyethyl cellulose, hydroxypropylcellulose, hydroxypropylmethylcellulose, methylcellulose, methylhydroxyethylcellulose, and sodium carboxymethyl cellulose, among others; poly(acrylic acid)-based polymers such as polyacrylates, poly(methylvinylether-co-methacrylic acid), poly(acrylic acid-co-ethylhexylacrylate), poly(acrylic acid-co-acrylamide), poly(acrylic acid-co-butylacrylate), poly(acrylic acid-co-methyl methacrylate), poly (2-hydroxyethyl methacrylate), polymethacrylates, poly(alkylcyanoacrylate) and other cyanoacrylates, poly(isohexycyanoacrylate), poly(isobutylcyanoacrylate), and hydroxyethyl methacrylate, and combinations thereof.

Embodiment 40 is the copolymer composition of any of embodiments 37 through 39 wherein the ratio of the silicone copolymer to the hydrophilic polymer is within a range of 1:5 to 5:1 (e.g., at a ratio of 1:1).

Embodiment 41 is the copolymer composition of any of embodiments 1 to 40 further comprising an antioxidant.

Embodiment 42 is the copolymer composition of embodiment 41 wherein the antioxidant is selected from the group of butylated hydroxyanisole (BHA E320), butylated hydroxytoluene (BHT), ascorbyl palmitate, propyl 3,4,5-trihydroxybenzoate (propyl gallate E310), a tocopherol, octyl 3,4,5-trihydroxybenzoate (octyl gallate E311), dodecyl 3,4,5-trihydroxybenzoate (dodecyl gallate E312), sodium ascorbate, a sterically hindered primary phenol (e.g., IRGANOX 1010 and IRGANOX 1076), a sulfur-containing primary phenol (e.g., IRGANOX 1035), and a mixture thereof.

Embodiment 43 is the copolymer composition of embodiment 41 or 42 comprising at least 0.25 wt-% of an antioxidant, based on the total weight of the copolymer composition.

Embodiment 44 is the copolymer composition of any of embodiments 41 to 43 comprising up to 5 wt-% of an antioxidant, based on the total weight of the copolymer composition.

Embodiment 45 is the copolymer composition of any of embodiments 1 to 44 further comprising an active agent.

Embodiment 46 is the copolymer composition of embodiment 45 wherein the active agent is selected from the group of an antimicrobial agent, an analgesic, a healing factor, a vitamin, a growth factor, a nutrient, nitric oxide, a nitric oxide releasing compound or system, nitroglycerin, an anti-inflammatory drug (both steroidal and nonsteroidal), an antibacterial, an antiprotazoal, an antifungal, a vasodilator, an enzyme inhibitor, an antiviral, an immunomodulatory, a local anesthetic, a peptide hormone, a hemostatic, and a mixture thereof.

Embodiment 47 is the copolymer composition of embodiment 45 or 46 comprising at least 0.05 wt-%, or at least 0.1 wt-%, or at least 0.25 wt-% of an active agent, based on the total weight of the copolymer composition.

Embodiment 48 is the copolymer composition of any of embodiments 45 to 47 comprising up to 10 wt-%, or up to 5 wt-%, of an active agent, based on the total weight of the copolymer composition.

Embodiment 49 is the copolymer composition of any of embodiments 1 to 48 further comprising an elutable surfactant.

Embodiment 50 is the copolymer composition of embodiment 49 wherein the elutable surfactant is selected from the group of mono- or di-((C6-C20)alkyl or (C6-C20)alkylene) esters of glycerin or propylene glycol, a glycerin or propylene glycol ((C6-C20)alkyl or (C6-C20)alkylene)ether, alkylpolyglucosides, alkyl esters of sucrose, polyethoxylated (C8-C20)alkyl alcohols or (C8-C20)alkylene alcohols or castor oil, phospholipids (such as lecithin, phosphatidylcholine, phosphatidylethanolamine, phosphatidylinositol, phosphatidylserine, and phosphatidic acid, 1,2-distearoyl-sn-glycero-3-phosphocholine, 1,2-dimyristoyl-sn-glycero-3-(phosphor-s-(1-glycerol)), polysorbates (such as polysorbate 20, 40, or 80 such as TWEEN 20), di-(C6-C20)alkyl sulfosuccinate, and a mixture thereof.

Embodiment 51 is the copolymer composition of embodiment 49 or 50 comprising at least 0.05 wt-%, or at least 0.1 wt-%, or at least 0.2 wt-%, or at least 0.5, or at least 1 wt-%, of an elutable surfactant, based on the total weight of the copolymer composition.

Embodiment 52 is the copolymer composition of any of embodiments 49 to 51 comprising up to 10 wt-%, or up to 5 wt-%, of an elutable surfactant, based on the total weight of the copolymer composition.

Embodiment 53 is the copolymer composition of any of embodiments 49 or 52 further comprising a surfactant carrier.

Embodiment 54 is the copolymer composition of embodiment 53 wherein the surfactant carrier comprises polyalkylene oxides such as polyethylene glycol, polypropylene glycol, random and block copolymers of ethylene oxide and propylene oxide, polyhydric alcohols such as propylene glycol, glycerin, polyglycerin, and the like. The polyalkylene oxides may be linear or branched depending on the initiating polyol. For example, a polyethylene glycol initiated using ethylene glycol would be linear but one initiated with glycerin, trimethylolpropane, or pentaerythritol would be branched. Preferred carriers also may include relatively low molecular weight (less than 1000 daltons and preferably less than 750 daltons) esters of polyhydric alcohols such as esters of glycerin or propylene glycol with (C1-C18)alkyl carboxylates optionally substituted with hydroxyl groups including, for example, triglycerides such as triacetin, glyceryl caprylate/caprate, castor oil and the like, propylene glycol monolaurate, propylene glycol dioctanoate and the like. (C2-C18)Esters of polycarboxylic acids having a molecular weight less than 500 also are suitable, such as esters of citric acid, malic acid, succinic acid, maleic acid, malonic acid. Examples of these carriers include acetyl tributyl citrate, tributyl citrate, triethyl citrate, diethyl citrate, diethyl malate.

Embodiment 55 is the copolymer composition of embodiment 53 or 54 comprising at least 0.2 wt-%, or at least 0.5 wt-%, or at least 1 wt-%, or at least 5 wt-%, of a surfactant carrier, based on the total weight of the copolymer composition.

Embodiment 56 is the copolymer composition of any of embodiments 53 to 55 comprising up to 20 wt-%, or up to 10 wt-%, of a surfactant carrier, based on the total weight of the copolymer composition.

Embodiment 57 is the copolymer composition of any of embodiments 1 to 56 disposed on a substrate (e.g., a 100% cotton surgical laparotomy sponge) at a coating weight sufficient to provide a coefficient of friction of at least 0.2, when tested wet according to the Friction Test Method described in the Examples Section.

Embodiment 58 is the copolymer composition of any of embodiments 1 to 57 disposed on a substrate (e.g., a 100% cotton surgical laparotomy sponge) at a coating weight sufficient to provide a coefficient of friction of up to 0.45, when tested wet according to the Friction Test Method described in the Examples Section.

Embodiment 59 is the copolymer composition of embodiment 58 disposed on a substrate (e.g., a 100% cotton surgical laparotomy sponge) at a coating weight sufficient to provide a coefficient of friction of up to 0.35, when tested wet according to the Friction Test Method described in the Examples Section.

Embodiment 60 is the copolymer composition of any of embodiments 37 to 40 and 45 to 56 which elutes at least a portion of a hydrophilic polymer, an elutable surfactant, and/or an active agent, to increase the wettability and/or activity of the copolymer composition.

Embodiment 61 is the copolymer composition of any of embodiments 1 to 36 and 41 to 44 wherein less than 10 wt-% leachates are leached out of the copolymer composition under aqueous extraction in saline for 24 hours.

Embodiment 62 is the copolymer composition of embodiment 61 wherein less than 5 wt-% leachates are leached out of the copolymer composition under aqueous extraction in saline for 24 hours.

Embodiment 63 is the copolymer composition of any of embodiments 1 to 62 which demonstrates less than 20% by weight of total leached compounds after sterilizing with gamma irradiation up to 50 kGy and aging for a period of 6 months at 23° C.

Embodiment 64 is the copolymer composition of embodiment 63 which demonstrates less than 10% by weight total leached compounds after sterilizing with gamma irradiation up to 50 kGy and aging for a period of 6 months at 23° C.

Embodiment 65 is the copolymer composition of any of embodiments 1 to 64 having a cell viability of at least 80% when tested according to the Cell Viability Test Method.

Embodiment 66 is an article comprising the copolymer composition of any of embodiments 1 to 65.

Embodiment 67 is the article of embodiment 66 wherein the copolymer composition is in the form of a mesh, a monofilament or multifilament yarn, a woven web, a nonwoven web, a film (which may be a structured film such as a microreplicated film, a microprofile film, an extruded film, or an embossed film, etc.), a foam, or a combination thereof.

Embodiment 68 is the article of embodiment 66 wherein the copolymer composition forms a coating on a substrate.

Embodiment 69 is the article of embodiment 68 wherein the coating is a continuous coating.

Embodiment 70 is the article of embodiment 68 wherein the coating is a discontinuous coating (e.g., pattern coating in the form of stripes, diamonds, dots, etc.).

Embodiment 71 is the article of any of embodiments 68 to 70 wherein the substrate is a mesh, a monofilament or multifilament yarn, a woven web, a nonwoven web, a film, a foam, or a combination thereof.

Embodiment 72 is the article of any of embodiments 66 to 71 which is a disposable surgical wound edge protector, a surgical retractor, or a surgical sponge.

Embodiment 73 is the article of embodiment 72 which is a lap sponge.

Embodiment 74 is the article of any of embodiments 66 to 71 which is a wound dressing, wound absorbent, wound contact layer, catamenial device, urinary or vascular access catheter, endotracheal tube, nasogastric tube, dialysis catheters and tubing stents, pacemaker shells, heart valves, orthopedic implants such as hips, knees, shoulders, etc., periodontal implants, orthodontic brackets and other orthodontic appliances, dentures, dental crowns, contact lenses, intraocular lenses, soft tissue implants (breast implants, penile implants, facial and hand implants, etc.), surgical tools, sutures including degradable sutures, cochlear implants, tympanoplasty tubes, shunts including shunts for hydrocephalus, post-surgical drain tubes and drain devices, and other implantable devices, and other indwelling devices.

Embodiment 75 is a method of making a copolymer composition, the method comprising:
forming a silicone copolymer by combining components comprising:
a silicone segment precursor in an amount of 5 wt-% to 40 wt-%, based on the total weight of the silicone copolymer;
a hydrophilic segment precursor in an amount of 40 wt-% to 75 wt-%, based on the total weight of the silicone copolymer; and
one or more chain extenders and one or more multi-functional isocyanates, multi-functional carboxylic acids, multi-functional anhydrides, multi-functional esters, and/or multi-functional acid halides in amounts sufficient to form reinforcing segments in an amount of 5 wt-% to 30 wt-%, based on the total weight of the silicone copolymer;
wherein the silicone segments, hydrophilic segments, and reinforcing segments are connected through urea, urethane, amide, and/or oxamide linkages;
wherein the hydrophilic segments and the reinforcing segments are present in a weight ratio of 1.8:1 to 8:1; and
wherein the hydrophilic segments and the silicone segments are present in a weight ratio of 1.3:1 to 4.5:1.

Embodiment 76 is the method of embodiment 75 wherein the copolymer is a random copolymer wherein the silicone segments, hydrophilic segments, and reinforcing segments are connected randomly through urea, urethane, amide, and/or oxamide linkages.

Embodiment 77 is the method of embodiment 75 or 76 wherein the silicone segment precursor comprises a compound according to the general Formula (VI):

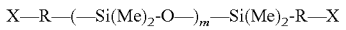

X—R—(—Si(Me)₂-O—)ₘ—Si(Me)₂-R—X wherein:
m is an integer ranging from 2 to 900;
the R groups are independently aliphatic groups; and
X is an active hydrogen containing group selected from —SH, —NHR¹, wherein R¹ is H, a (C1-C4)alkyl group, or —O—(—CH₂—CHR²—O—)ₚ—H, wherein R² is H or CH₃ and p is an integer ranging from 0 to 100, or p is an integer ranging from 0 to 30.

Embodiment 78 is the method of any of embodiments 75 to 77 wherein the hydrophilic segment precursor comprises a polyether oligomer of Formula (II) or Formula (IV):

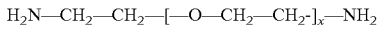

H₂N—CH₂—CH₂—[—O—CH₂—CH₂-]ₓ—NH₂

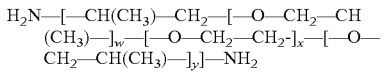

H₂N—[—CH(CH₃)—CH₂—[—O—CH₂—CH
(CH₃)—]w—[—O—CH₂—CH₂-]ₓ—[—O—
CH₂—CH(CH₃)—]y]—NH₂ wherein: x is an integer ranging from 2 to 60; and the sum of w and y is an integer ranging from 2 to 8.

Embodiment 79 is the method of any of embodiments 75 to 78 wherein the components comprise one or more chain extenders and one or more multi-functional isocyanates in amounts sufficient to form reinforcing segments in an amount of 5 wt-% to 30 wt-%, based on the total weight of the silicone copolymer.

Embodiment 80 is the method of any of embodiments 75 to 79 wherein the one or more chain extenders comprise (C3-C12)multi-amines and/or (C3-C12)multi-ol.

Embodiment 81 is the method of embodiment 80 wherein the one or more chain extenders comprise one or more chain-extending (C3-C12)multi-functional amines selected from the group of hexamethylene diamine (HMDA), xylylene diamine, 1,3-di(4-piperidyl)propane (DIPIP), N-2- aminoethyl propylmethyldimethoxysilane (DAS), 1,3-diaminopentane (DAMP), 1,4-diaminopentane, 4,4'-methylenebiscyclohexylamine, piperazine, lysine, piperidyl propane, and a mixture thereof.

Embodiment 82 is the method of any of embodiments 75 to 81 further comprising combining the silicone copolymer with a hydrophilic polymer to form the copolymer composition.

Embodiment 83 is the method of any of embodiments 75 to 82 further comprising combining the silicone copolymer with an antioxidant to form the copolymer composition.

Embodiment 84 is the method of any of embodiments 75 to 83 further comprising combining the silicone copolymer with an active agent to form the copolymer composition.

Embodiment 85 is the method of any of embodiments 75 to 84 further comprising combining the silicone copolymer with an elutable surfactant, optionally with a surfactant carrier, to form the copolymer composition.

EXAMPLES

The following examples are given to illustrate, but not limit, the scope of this invention. As used herein, all parts and percentages are by weight unless otherwise specified. All commercial materials were used as obtained from the vendor. Unless otherwise specified, materials can be obtained from Sigma-Aldrich Corp. (St. Louis, Mo.).

Materials

As used herein, all parts and percentages are by weight unless otherwise specified. All commercial materials were used as obtained from the vendor. Unless otherwise specified in Table 1, materials were obtained from Sigma-Aldrich Corp. (St. Louis, Mo.).

TABLE 1

Materials used in Examples.

| Material | Source | Description |
|---|---|---|
| Silicone diamine #1 | Synthesized | A high purity silicone diamine molecular weight (MW) 5000 (Si 5000) $$H_2N-Y-\underset{R^1}{\overset{R^1}{\underset{|}{Si}}}{\left[O-\underset{R^1}{\overset{R^1}{\underset{|}{Si}}}\right]_{\overline{n}}}O-\underset{R^1}{\overset{R^1}{\underset{|}{Si}}}-Y-NH_2$$ $Y = CH_2CH_2CH_2$ $R^1 = CH_3$ |
| Silicon diamine #2 | Wacker Chemical Corporation, Adrian, MI (Fluid NH15-D) | 3-Aminopropyl terminated polydimethylsiloxane MW 1000 (Si 1000) |
| Silicone diamine #3 | Synthesized | A high purity silicone diamine molecular weight (MW) 2000 (Si 2000) $$H_2N-Y-\underset{R^1}{\overset{R^1}{\underset{|}{Si}}}{\left[O-\underset{R^1}{\overset{R^1}{\underset{|}{Si}}}\right]_{\overline{n}}}O-\underset{R^1}{\overset{R^1}{\underset{|}{Si}}}-Y-NH_2$$ $Y = CH_2CH_2CH_2$ $R^1 = CH_3$ |
| Diamine #4 | Synthesized | $$H_2N\underset{}{\overset{CH_3}{\underset{|}{\frown}}}\left[O\underset{}{\overset{CH_3}{\underset{|}{\frown}}}\right]_x\underset{NH}{\overset{O}{\underset{\|}{\frown}}}\underset{NH}{\frown}\underset{}{\overset{CH_3}{\underset{|}{\frown}}}\left[O\underset{}{\overset{CH_3}{\underset{|}{\frown}}}\right]_x NH_2$$ x approximately 6.1 |
| JEFFAMINE D-400 | Huntsman, The Woodlands, TX | Difunctional, primary amine, MW 400 CAS #9046-10-0 |

TABLE 1-continued

Materials used in Examples.

| Material | Source | Description |
|---|---|---|
| Polyetheramine JEFFAMINE ED 2003 Polyetheramine (JA ED 2003) | Huntsman, The Woodlands, TX (Product# XTJ-502) | Water-soluble aliphatic polyether diamine derived from a propylene oxide-capped polyethylene glycol, MW 2000 $$H_2N-\left(-O-\right)_x\left(-O-\right)_y\left(-O-\right)_z NH_2$$ (with CH$_3$ groups) y = 39, (x + z) = 6 |
| Oxamide-terminated JEFFAMINE ED 2003 (Ox-JA ED 2003) | Synthesized | $$R^2-O-\overset{O}{\underset{\|}{C}}-B-\overset{O}{\underset{\|}{C}}-(N-D-N-\overset{O}{\underset{\|}{C}}-B-\overset{O}{\underset{\|}{C}})_p-O-R^2$$ D is an organic soft segment residue; p is 10; and $R^2$ is $CH_3$; B is a covalent bond; MW 20,000 |
| 1,3-Diamino-pentane (DAMP) | Sigma Aldrich, St. Louis, MO (Product# 381675) | CAS #589-37-7 |
| Isophorone diisocyanate (IPDI) | Sigma Aldrich, St. Louis, MO (Product# 317624) | |
| 4,4'-Methylenebis-cyclohexylamine (MBCH) | Sigma Aldrich St. Louis, MO (Product# 368849) | |
| 4,4'-Methylenebis (cyclohexyl isocyanate), mixture of isomers (H12MDI) | Covestro (Formerly Bayer MateriScience Coatings Raw Materials) Leverkusen, Germany (Desmodur ® W) | |
| DMEM culture medium | Gibco, Grand Island, NY (Product# 11995-065) | Dulbecco's minimum essential culture medium |
| FBS | Corning, Manassas, VA (Product# 35-011-CV) | Fetal bovine serum |
| PenStrep | Gibco, Grand Island, NY (Product# 15140-122) | Penicillin and streptomycin mixture |
| Lap sponge | Medline Industries, Inc., Mundelein, IL (Product# MDS231318LFH) | Laparotomy sponge |
| Sausage casing | The Sausage Maker, Inc., | Sausage casings (Natural Hog Casings |

TABLE 1-continued

Materials used in Examples.

| Material | Source | Description |
| --- | --- | --- |
| | Buffalo, NY (Product# 21700) | |
| Powder-free nitrile exam glove | Kimberly-Clark, Roswell, GA (Product# 55082) | Powder-free nitrile exam glove |
| EG80A | Lubrizol Corporation, Wickliffe, OH | Aliphatic polyether-based thermoplastic polyurethane (TECOFLEX) |
| TG-2000 | Lubrizol Corporation, Wickliffe, OH | Aliphatic, polyether-based hydrogel thermoplastic polyurethane (TECOPHILIC Hydrogel) |
| HP60D-35 | Lubrizol Corporation, Wickliffe, OH | Aliphatic polyether-based thermoplastic polyurethane (TECOPHILIC) |
| SILPURAN 2450 A/B | Wacker Chemie AG, Adrian, MI, (Product# 60082831) | Addition-curing RTV-2 silicon rubber |
| IRGANOX 1010 | Sigma Aldrich, St. Louis, MO (Product# 441783) | Pentaerythritol tetrakis(3-(3,5-di-tert-butyl-4-hydroxyphenyl)propionate) CAS# 6683-19-8 |

TABLE 2

Nonwoven Materials used in Examples.

| Material | Source | Description |
| --- | --- | --- |
| NW-A | Cerex Advanced Fabrics, Inc., Pensacola, FL | PBN-II Cerex 30100; spunbond nylon 6,6; thermal, spunbond nylon cross hatch bond pattern nonwoven, 34 grams per square meter (gsm) |
| NW-B | Xiamen Yanjan Industry Co., LTD, Xiamen, China | LS-01 (1.5); polyethylene based perforated film, 0.4 mm thick, 22.5 gsm |

Silicone Polyurea (SPU) Synthesis

Silicone diamine #1 or #2, JEFFAMINE ED 2003, diamine #3, and/or oxamide-terminated JEFFAMINE ED 2003, 1,3-diaminopentane (chain extender, hard segment), and 2-isopropanol (IPA) were charged in a four neck 2-liter resin flask equipped with an agitator, a dropping funnel, a nitrogen inlet, and a thermocouple. The resulting homogenous solution was purged with nitrogen at 1 liter per minute (min) for 2 minutes and a blanket of $N_2$ was kept over the solution for the entire time during the reaction. Isophorone diisocyanate (IPDI) was added to the solution in the flask dropwise from the dropping funnel at a rate so that the temperature of the reaction did not go beyond 29.5° C. After all the IPDI was added, the reaction was stirred for another 30 minutes before % solids and residual amine equivalent were measured. For solution 24, a 1:1 mixture of amyl alcohol:IPA was used instead of IPA alone.

TABLE 3

Preparatory Example Solutions.

| Solution # | Silicone Diamine #1 (wt-%) | Silicone Diamine #2 (wt-%) | Silicone Diamine #3 (wt-%) | Diamine #3 (wt-%) | JA ED 2003 (wt-%) | Ox-JA ED 2003 (total wt. 20k) (wt-%) | DAMP-IPDI (approximately 1:4 by wt.) (wt-%) | MBCH-H12MDI (approximately 1:3 by wt.) (wt %) |
| --- | --- | --- | --- | --- | --- | --- | --- | --- |
| 1 | 30 | — | — | 10 | 40 | — | 20 | — |
| 2 | 30 | — | — | — | 50 | — | 20 | — |
| 3 | 30 | — | — | 21.25 | 21.25 | — | 27.5 | — |
| 4 | 30 | — | — | — | 42.5 | — | 27.5 | — |
| 5 | 30 | — | — | — | 35 | — | 35 | — |
| 6 | 15 | — | — | 15 | 50 | — | 20 | — |
| 7 | 15 | — | — | — | 65 | — | 20 | — |
| 8 | — | 15 | — | — | 65 | — | 20 | — |
| 9 | 5 | — | — | — | 75 | — | 20 | — |
| 10 | — | 5 | — | — | 75 | — | 20 | — |
| 11 | 22.5 | — | — | 7.5 | 50 | — | 20 | — |
| 12 | 20 | — | — | 10 | 50 | — | 20 | — |
| 13 | 22.5 | — | — | 25.2 | 25.2 | — | 27.1 | — |
| 14 | 14.2 | 14.2 | — | — | 47.5 | — | 31.4 | — |
| 15 | 14.2 | 14.2 | — | 20.1 | 20.1 | — | 24.1 | — |
| 16 | 5 | — | — | — | — | 75 | 20 | — |
| 17 | — | 5 | — | — | — | 75 | 20 | — |
| 18 | 30 | — | — | — | 50 | — | — | 20 |
| 19 | 30 | — | — | — | 55 | — | — | 15 |
| 20 | 30 | — | — | — | 60 | — | — | 10 |

TABLE 3-continued

Preparatory Example Solutions.

| Solution # | Silicone Diamine #1 (wt-%) | Silicone Diamine #2 (wt-%) | Silicone Diamine #3 (wt-%) | Diamine #3 (wt-%) | JA ED 2003 (wt-%) | Ox-JA ED 2003 (total wt. 20k) (wt-%) | DAMP-IPDI (approximately 1:4 by wt.) (wt-%) | MBCH-H12MDI (approximately 1:3 by wt.) (wt %) |
|---|---|---|---|---|---|---|---|---|
| 21 | 15 | — | — | — | 65 | — | — | 15 |
| 22 | 15 | — | — | — | 70 | — | — | 15 |
| 23 | — | — | 15 | — | 65 | — | — | 20 |
| 24 | — | — | 15 | — | 65 | — | — | 20 |

Silicone Polyurea Substrate Preparation

Examples (Ex) 1-15, 18-24 (Cast Films)

The SPU solutions (10 wt-% solids in isopropyl alcohol; IPA or IPA amyl alcohol mixture) described in Table 3 were poured into polypropylene weigh boats and dried at room temperature for 18 hours to allow the solvent to evaporate. Examples 1-15 were created with SPU solutions 1-15 (Table 3), respectively. In some cases, the cast films were sterilized by ethylene oxide (3 hours at 37-55° C. with 24 hours aeration in a STERI-VAC 5XL) or gamma irradiation (10-50 kGy) as designated below in tested examples.

Examples 16-17 (Cast Films)

The solutions (5 wt-% solids in tetrahydrofuran; THF) described in Table 3 were poured into glass petri dishes and dried at room temperature for 18 hours to allow the solvent to evaporate. Examples 16-17 were created with solutions 16-17 (Table 3), respectively. In some cases, the cast films were sterilized by ethylene oxide (3 hours at 37-55° C. with 24 hours aeration in a STERI-VAC 5XL) or gamma irradiation (10-50 kGy) as designated below in tested examples.

Examples 2A-2C (Cast Films with Antioxidant Addition)

SPU solution 2 (Table 3) was synthesized as described above and IRGANOX 1010 was added to the solution at 0, 0.25, 0.5, or 1% with respect to SPU polymer weight (Examples 2, 2A, 2B, 2C, respectively). In some cases, the cast films were sterilized by ethylene oxide (3 hours at 37-55° C. with 24 hours aeration in a STERI-VAC 5XL) or gamma irradiation (10-50 kGy) as designated below in tested examples.

Examples 1L, 2L, 6L-15L, 19L, 20L, 22L (Coated Lap Sponges)

The SPU solutions (5 wt-% solids in IPA) described in Table 3 were sprayed (60 milliliters per side (mL/side)) onto lap sponges (Medline Industries, Inc.) and dried at room temperature for 18 hours to allow the solvent to evaporate. Coated lap sponges were sterilized by ethylene oxide (3 hours at 37-55° C. with 24 hours aeration in a STERI-VAC 5XL). Examples 1L, 2L, 6L-15L were coated with solutions 1, 2, 6-15 (Table 3), respectively. Coated lap sponges were approximately 115 gsm.

Examples 16L-17L (Coated Lap Sponges)

The solutions (5 wt-% solids in THF) described in Table 3 were sprayed (60 mL/side) onto lap sponges (Medline Industries, Inc.) and dried at room temperature for 18 hours to allow the solvent to evaporate. Examples 16L-17L were coated with solutions 16-17 (Table 3), respectively. Coated lap sponges were 115 gsm.

Example 2NW-A (Coated Cerex Nonwoven)

An amount of 30 ml of SPU solution 2 was coated with a No. 40 Meyer rod onto NW-A (PBN II Cerex 30100) (size 25.4×30.5 centimeters (cm); Table 2) and dried at room temperature for 18 hours to allow the solvent to evaporate. The wt-% solids of SPU solution 2 was varied as described in Tables 7 and 11.

Example 2NW-B (Coated LS-01 Nonwoven)

An amount of 30 ml of SPU solution 2 was coated with a No. 40 Meyer rod onto NW-B (LS-01) (size 25.4×30.5 cm; Table 2) and dried at room temperature for 18 hours to allow the solvent to evaporate. The wt-% solids of SPU solution 2 was varied as described in Tables 7 and 11.

Comparative Examples

Comparative Example 1 (Comp Ex 1)

A cotton lap sponge made by Medline Industries, Inc. of size 45.7×45.7 cm and 98 gsm.

Comparative Example 2

A powder-free nitrile exam glove made by Kimberly-Clark.

Comparative Example 3

TG-2000 solution (2 wt-% solids in THF) was sprayed (60 mL/side) onto lap sponges and dried at room temperature for 18 hours to allow the solvent to evaporate.

Comparative Example 4

EG80A solution (2 wt-% solids in THF) was sprayed (60 mL/side) onto lap sponges and dried at room temperature for 18 hours to allow the solvent to evaporate.

Comparative Example 5

TG-2000 film, 0.13 millimeter (mm) thick.

Comparative Example 6

EG80A film, 0.18 mm thick.

Comparative Example 7

SILPURAN silicone 2450 film, prepared according to manufacturer's instructions.

Comparative Example 8

HP60D-35 film, 0.025 mm thick.

Test Methods

Friction Testing

Friction testing was measured using a FORCEBOARD friction tester (Industrial Dynamics, Sweden). Friction test substrates, sausage casing and excised pig intestine, were prepared as follows.

The sausage casing substrate was a piece of sausage casing cut (approximately 12 cm long and 3 cm wide), rinsed in distilled water to remove salt, and hydrated for at least 30 minutes in lukewarm distilled water. Sausage casing was placed on the FORCEBOARD mounting plate and secured with binder clips.

The excised pig intestine substrate was pig intestine was excised from post-mortem American Yorkshire pigs. The intestine was cut lengthwise and rinsed in 0.9% saline to remove intestinal contents. Intestine was used either wet, i.e., rinsed in 0.9% saline immediately prior to use; or dry, i.e., air-dried or blow-dried with mild heat to remove moisture. Intestines were further cut to approximately 12 cm×3 cm pieces and were placed on the FORCEBOARD mounting plate, serosal side up. The intestine was secured to the mounting plate using binder clips.

Friction test substrates (i.e., sausage casing and excised pig intestine) were manually rubbed with example substrates at a target vertical force of 2.9-3.1 Newtons (N). Example substrates were tested dry and wet (soaked in 0.9% saline for at least 30 minutes).

Friction coefficients were calculated by the FORCEBOARD Analyzer software (Industrial Dynamics, Sweden) and exported into MICROSOFT EXCEL. An algorithm in MICROSOFT EXCEL was used to calculate the mean±standard deviation for friction coefficients obtained when rubbing against the friction test substrate occurred at the target vertical force of 2.9-3.1 N. In some cases, the material got stuck against the sausage casing or intestine substrate, meaning that it could not slide at a vertical force of approximately 3 N.

Cell Viability Testing

Ethylene oxide- or gamma irradiation-sterilized SPU-coated substrates (7.6×7.6 cm) were placed into sterile square petri dishes (100 mm×100 mm) with 21 mL of DMEM cell culture media containing 10% fetal bovine serum and 1× Penstrep (extraction ratio of approximately 5.5 $cm^2$/mL). These samples were placed in a humidified environment at 37° C. with 5% $CO_2$. After 24 hours, the extraction liquid was collected and added to cultures of human dermal fibroblasts seeded into wells of a 48-well plate (approximately 10,000 cells/well; 0.5 mL volume). The cells were incubated for 24 hours in a humidified environment at 37° C. with 5% $CO_2$ and cell viability was tested as previously described by O'Brien, using resazurin (O'Brien J. et al., 2000, Eur. J. Biochem, 267(17):5421-5426). Cell viability was normalized to an untreated cell control. This testing was modified from "ISO 10993-12: 2002 Biological evaluation of medical devices—Part 12: sample preparation and reference materials."

Analysis of Polymer Leachables

A 1.27 cm circular disk was punched out of SPU cast films, weighed, and placed in 1.5 mL of 0.9% saline solution for 24 hours. After 24 hours, the extracts were analyzed by high performance liquid chromatography (HPLC: Poroshell 120 EC-C18 2.1×100 millimeters (mm); 2.7 micrometer (m) column; 40° C., 0.3 mL/min; 95% water/5% methanol to 100% methanol over 15 minutes; Detector: CAD: nebulizer temperature=25° C.; data rate=10 Hz; UV: 220 nanometers (nm), 254 nm, and 280 nm each at bandwidth of 10 nm with reference at 550 nm/50 nm bandwidth; peak width=0.10 min (5 Hz); response time=2 seconds). The amount of leachables was determined using a calibration curve of SPU solution 2 (Table 3). All samples were prepared and analyzed in duplicate. The percentage extracted was calculated by dividing the amount extracted by the initial film weight. The average and standard deviation were determined and plotted.

Hydration Testing

Water absorption was determined by measuring weight gain after fully hydrating the cast films in deionized water for more than one hour. These water absorption (i.e., hydration) test results are shown in Table 10.

Stiffness Testing

Stiffness of the SPU coated substrates were tested according to ASTM D4032-08 standard test method for stiffness of fabric by the circular bend procedure. Substrates were tested dry and wet (soaked in 0.9% saline for at least 30 minutes). Stiffness test results are shown in Table 11.

Test Results

TABLE 4

Friction coefficients (mean ± standard deviation at 2.9-3.1 N vertical force) of dry or wet SPU-coated lap sponges against hydrated (wet) sausage casing.

| Example | | Friction Coefficient (mean ± SD) | |
|---|---|---|---|
| Example | Lap Sponge Coated with Solution # | Dry Substrate on Wet Sausage Casing | Wet Substrate on Wet Sausage Casing |
| Ex 1L | 1 | Not tested | 0.47 ± 0.06 |
| Ex 2L | 2 | 0.34 ± 0.07 | 0.39 ± 0.08 |
| Ex 7L | 7 | 0.28 ± 0.04 | 0.34 ± 0.07 |
| Ex 8L | 8 | Not tested | 0.38 ± 0.05 |
| Ex 9L | 9 | Not tested | 0.44 ± 0.06 |
| Ex 10L | 10 | Not tested | 0.39 ± 0.07 |
| Ex 11L | 11 | 0.28 ± 0.06 | Not tested |
| Ex 12L | 12 | 0.25 ± 0.06 | 0.31 ± 0.08 |
| Ex 13L | 13 | 0.36 ± 0.04 | 0.37 ± 0.06 |
| Ex 14L | 14 | 0.38 ± 0.04 | 0.39 ± 0.05 |
| Ex 15L | 15 | 0.42 ± 0.05 | 0.40 ± 0.04 |
| Ex 16L | 16 | 0.23 ± 0.04 | 0.42 ± 0.06 |
| Ex 17L | 17 | Not tested | 0.35 ± 0.07 |
| Ex 19L | 19 | 0.47 ± 0.05 | 0.43 ± 0.04 |
| Ex 20L | 20 | 0.45 ± 0.06 | 0.49 ± 0.06 |
| Ex 22L | 22 | 0.44 ± 0.05 | 0.42 ± 0.03 |
| Comp Ex 1 | N/A | 0.79 ± 0.07 | 0.94 ± 0.07 |
| Comp Ex 2 | N/A | Not tested | 0.16 ± 0.06 |
| Comp Ex 3 | N/A | 0.24 ± 0.03 | 0.39 ± 0.08 |

N/A = Not Applicable

TABLE 5

Friction coefficients (mean ± standard deviation at 2.9-3.1 N vertical force) of dry or wet SPU-coated lap sponges against dry or wet pig intestine.

| Example | Lap Sponge Coated with Solution # | Dry Substrate on Wet Pig Intestine | Wet Substrate on Wet Pig Intestine | Dry Substrate on Dry Pig Intestine | Wet Substrate on Dry Pig Intestine |
|---|---|---|---|---|---|
| Ex 2L | 2 | 0.29 ± 0.14 | 0.29 ± 0.14 | 0.41 ± 0.04 | 0.39 ± 0.06 |
| Ex 6L | 6 | 0.44 ± 0.05 | 0.49 ± 0.08 | Not tested | Not tested |
| Ex 7L | 7 | 0.43 ± 0.08 | 0.34 ± 0.07 | 0.44 ± 0.07 | 0.52 ± 0.11 |
| Ex 16L | 16 | 0.38 ± 0.05 | 0.31 ± 0.03 | 0.40 ± 0.05 | 0.45 ± 0.10 |
| Ex 17L | 17 | Not tested | 0.47 ± 0.12 | Not tested | Not tested |
| Comp Ex 1 | N/A | 0.76 ± 0.06 | 0.84 ± 0.08 | 0.46 ± 0.12 | 0.62 ± 0.18 |
| Comp Ex 2 | N/A | Not tested | 0.14 ± 0.02 | Not tested | Not tested |
| Comp Ex 3 | N/A | 0.28 ± 0.05 | 0.30 ± 0.07 | 0.35 ± 0.05 | 0.31 ± 0.09 |
| Comp Ex 4 | N/A | 0.59 ± 0.04 | 0.49 ± 0.18 | 0.31 ± 0.04 | 0.71 ± 0.22 |

TABLE 6

Friction coefficients (mean ± standard deviation at 2.9-3.1 N vertical force) of dry or wet films against dry or wet pig intestine.

| Example | Free standing film of Solution # | Dry Substrate on Wet Pig Intestine | Wet Substrate on Wet Pig Intestine | Dry Substrate on Dry Pig Intestine | Wet Substrate on Dry Pig Intestine |
|---|---|---|---|---|---|
| Ex 1 | 1 | 0.02 ± 0.02 | 0.00 ± 0.00 | Stuck | 0.33 ± 0.18 |
| Ex 2 | 2 | 0.07 ± 0.02 | 0.00 ± 0.01 | Stuck | 0.53 ± 0.09 |
| Ex 3 | 3 | 0.05 ± 0.01 | 0.00 ± 0.00 | Stuck | 0.09 ± 0.10 |
| Ex 4 | 4 | 0.04 ± 0.02 | 0.01 ± 0.02 | 0.43 ± 0.05 | 0.36 ± 0.18 |
| Ex 5 | 5 | 0.08 ± 0.05 | 0.01 ± 0.02 | 0.45 ± 0.04 | 0.13 ± 0.25 |
| Ex 7 | 7 | 0.07 ± 0.01 | 0.00 ± 0.00 | Stuck | 0.36 ± 0.16 |
| Ex 16 | 16 | 0.24 ± 0.11 | 0.02 ± 0.03 | Stuck | 0.21 ± 0.12 |
| Comp Ex 2 | N/A | 0.07 ± 0.01 | 0.04 ± 0.02 | 0.65 ± 0.12 | 0.17 ± 0.09 |
| Comp Ex 5 | N/A | 0.08 ± 0.02 | 0.00 ± 0.00 | Stuck | 0.23 ± 0.06 |
| Comp Ex 6 | N/A | 0.04 ± 0.03 | 0.00 ± 0.01 | Stuck | Stuck |
| Comp Ex 7 | N/A | 0.03 ± 0.02 | 0.00 ± 0.00 | Stuck | Stuck |
| Comp Ex 8 | N/A | 0.03 ± 0.02 | 0.00 ± 0.01 | Stuck | Stuck |

Comparative Examples 6, 7, and 8 became stuck when rubbed against dry intestine (an unacceptable level of friction), differentiating those examples from Examples 1, 2, 3, 4, 5, 7, and 16.

TABLE 7

Friction coefficients (mean ± standard deviation at 2.9-3.1 N vertical force) of dry or wet nonwoven substrates against hydrated (wet) sausage casing.

| Example | Nonwoven Substrate | wt-% solids of 30 ml Solution 2 | Dry Substrate on Wet Sausage Casing | Wet Substrate on Wet Sausage Casing |
|---|---|---|---|---|
| Ex 2NW-A | NW-A (PBN II Cerex 30100) | 0 | 0.62 ± 0.04 | 0.58 ± 0.01 |
|  |  | 2.5 | 0.46 ± 0.04 | 0.45 ± 0.02 |
|  |  | 5 | 0.36 ± 0.02 | 0.23 ± 0.02 |
|  |  | 7.5 | 0.24 ± 0.05 | 0.12 ± 0.01 |
|  |  | 10 | 0.22 ± 0.06 | 0.15 ± 0.02 |
| Ex 2NW-B | NW-B (LS-01 (1.5)) | 0 | 0.33 ± 0.04 | 0.52 ± 0.05 |
|  |  | 2.5 | 0.22 ± 0.05 | 0.26 ± 0.05 |
|  |  | 5 | 0.31 ± 0.05 | 0.33 ± 0.06 |
|  |  | 7.5 | 0.19 ± 0.01 | 0.25 ± 0.04 |
|  |  | 10 | 0.25 ± 0.05 | 0.23 ± 0.05 |

TABLE 8

Cell viability (mean ± standard deviation) of human dermal fibroblasts treated with 24-hour extracts from standard (uncoated) and coated lap sponges.

| Example | Lap Sponge Coated with Solution # | Cell Viability (% of Untreated Cell Control) |
|---|---|---|
| Ex 2L | 2 | 92 ± 4 |
| Ex 7L | 7 | 89 ± 4 |
| Ex 11L | 11 | 85 ± 11 |
| Ex 12L | 12 | 82 ± 10 |
| Ex 13L | 13 | 73 ± 14 |
| Ex 14L | 14 | 90 ± 9 |
| Ex 15L | 15 | 75 ± 9 |
| Ex 16L | 16 | 96 ± 3 |
| Comp Ex 1 | N/A | 103 ± 9 |
| Comp Ex 3 | N/A | 79 ± 5 |

TABLE 9

Cell viability (mean ± standard deviation) of human dermal fibroblasts treated with 24-hour extracts from examples 2 and 2A-2C. Percent leachables (mean ± standard deviation) extracted from Example films in saline for 24 hours.

| Example | % IRGANOX 1010 (with respect to polymer weight) | Cell Viability (% compared to untreated control) EO Sterilization | Cell Viability (% compared to untreated control) Gamma Sterilization | Percent Leachables EO Sterilization | Percent Leachables Gamma Sterilization |
|---|---|---|---|---|---|
| Ex 2 | 0.00 | 99 ± 3 | 0 ± 2 | 1.24 ± 0.04 | 4.2 ± 0.1 |
| Ex 2A | 0.25 | 92 ± 4 | 39.5 ± 0.7 | 1.25 ± 0.03 | 2.0 ± 0.4 |
| Ex 2B | 0.50 | 90 ± 4 | 91 ± 4 | 1.24 ± 0.01 | 1.8 ± 0.01 |
| Ex 2C | 1.00 | 101 ± 4 | 99.5 ± 0.7 | 1.27 ± 0.01 | 1.6 ± 0.1 |

TABLE 10

Percent water absorption of films.

| Example | Free standing film of Solution # | % Water Absorption |
|---|---|---|
| Ex 1 | 1 | 150 |
| Ex 2 | 2 | 187 |
| Ex 3 | 3 | 88 |
| Ex 4 | 4 | 119 |
| Ex 5 | 5 | 87 |
| Ex 7 | 7 | 377 |
| Ex 11 | 11 | 223 |
| Ex 15 | 15 | 67 |
| Ex 18 | 18 | 142 |
| Ex 19 | 19 | 168 |

TABLE 10-continued

Percent water absorption of films.

| Example | Free standing film of Solution # | % Water Absorption |
|---|---|---|
| Ex 20 | 20 | 217 |
| Ex 21 | 21 | 170 |
| Ex 22 | 22 | 244 |
| Comp Ex 5 | N/A | 1442 |
| Comp Ex 8 | N/A | 52 |

TABLE 11

Stiffness of dry or wet nonwoven substrates based on circular bendtesting according to ASTM D4032-08.

| Example | Nonwoven Description | wt-% solids of 30 ml Solution #2 | Circular Bend (N) Dry Substrate | Wet Substrate |
|---|---|---|---|---|
| Ex 2NW-A | PBN II Cerex 30100 | 0 | 0.6 | 0.8 |
|  |  | 5 | 1.0 | 0.7 |
|  |  | 10 | 1.3 | 0.8 |
| Ex 2NW-B | LS-01 (1.5) | 0 | 0.3 | 0.4 |
|  |  | 5 | 0.4 | 0.5 |
|  |  | 10 | 0.5 | 0.5 |

The referenced descriptions contained in the patents, patent documents, and publications cited herein are incorporated by reference in their entirety as if each were individually incorporated. Various unforeseeable modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only, with the scope of the disclosure intended to be limited only by the claims set forth herein as follows.

What is claimed is:

1. A copolymer composition comprising:
a random silicone copolymer having a backbone composition comprising:
silicone segments in an amount of 5 wt-% to 40 wt-%, based on the total weight of the copolymer;
hydrophilic segments in an amount of 40 wt-% to 75 wt-%, based on the total weight of the copolymer; and
reinforcing segments in an amount of 5 wt-% to 30 wt-%, based on the total weight of the copolymer, wherein the reinforcing segments are derived from the reaction of one or more chain extenders with one or more multi-functional isocyanates, multi-functional carboxylic acids, multi-functional anhydrides, multi-functional esters, or multi-functional acid halides;
wherein the silicone segments, hydrophilic segments, and reinforcing segments are connected randomly through urea, urethane, amide, and/or oxamide linkages;
wherein the hydrophilic segments and the reinforcing segments are present in a weight ratio of 1.8:1 to 8:1; and
wherein the hydrophilic segments and the silicone segments are present in a weight ratio of 1.3:1 to 4.5:1; and
wherein the copolymer composition further comprises a hydrophilic polymer.

2. The copolymer composition of claim 1 wherein the hydrophilic segments comprise polyethylene glycol groups, polypropylene glycol groups, polybutylene oxide groups, polyester groups, amine-terminated polyester groups, amine-terminated polyamide groups, polyester-amide groups, polycarbonate groups, or combinations thereof.

3. The copolymer composition of claim 2 wherein the hydrophilic segments comprise polyethylene glycol groups in an amount of 40 wt-% to 75 wt-%, based on the total weight of the copolymer.

4. The copolymer composition of claim 3 wherein the backbone composition comprises polypropylene glycol segments in an amount of up to 10 wt-%, based on the total weight of the copolymer.

5. The copolymer composition of claim 1 wherein the number average molecular weight of the silicone segments is at least 1,000 grams/mole.

6. The copolymer composition of claim 1 wherein the number average molecular weight of the hydrophilic segments is at least 1,000 grams/mole.

7. The copolymer composition of claim 1 wherein the silicone segments comprise $-Si(Me)_2-O-)_m$ groups, wherein m is an integer ranging from 2 to 900.

8. The copolymer composition of claim 1 wherein the hydrophilic segments have a formula according to Formula I or Formula III:

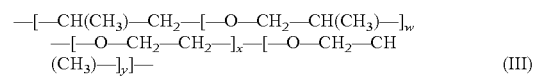

wherein x is an integer ranging from 2 to 60, and the sum of w and y is an integer ranging from 2 to 8.

9. The copolymer composition of claim 1 wherein the one or more multi-functional isocyanates are selected from the group of aromatic multi-functional isocyanates, cycloaliphatic multi-functional isocyanates, aliphatic multi-functional isocyanates, and araliphatic multi-functional isocyanates, used either alone or in mixtures of two or more.

10. The copolymer composition of claim 1 wherein the one or more chain extenders comprise one or more chain-extending (C3-C12)multi-functional amines.

11. The copolymer composition of claim 1 further comprising an antioxidant.

12. The copolymer composition of claim 1 further comprising an active agent.

13. The copolymer composition of claim 1 further comprising an elutable surfactant and optionally a surfactant carrier.

14. The copolymer composition of claim 13 further comprising a surfactant carrier selected from polyalkylene oxides, polyhydric alcohols, esters of polyhydric alcohols with (C1-C18)alkyl carboxylates optionally substituted with hydroxyl groups, (C2-C18)esters of polycarboxylic acids, and mixtures thereof.

15. The copolymer composition of claim 1 which demonstrates less than 20% by weight of total leached compounds after sterilizing with gamma irradiation up to 50 kGy and aging for a period of 6 months at 23° C.

16. An article comprising the copolymer composition of claim 1.

17. The article of claim 16 which is a disposable surgical wound edge protector, a surgical retractor, or a surgical sponge.

18. A method of making a copolymer composition, the method comprising:

forming a random silicone copolymer by combining components comprising:
- a silicone segment precursor in an amount of 5 wt-% to 40 wt-%, based on the total weight of the silicone copolymer;
- a hydrophilic segment precursor in an amount of 40 wt-% to 75 wt-%, based on the total weight of the silicone copolymer; and
- one or more chain extenders and one or more multi-functional isocyanates, multi-functional carboxylic acids, multi-functional anhydrides, multi-functional esters, or multi-functional acid halides in amounts sufficient to form reinforcing segments in an amount of 5 wt-% to 30 wt-%, based on the total weight of the silicone copolymer;
- wherein the silicone segments, hydrophilic segments, and reinforcing segments are connected randomly through urea, urethane, amide, and/or oxamide linkages;
- wherein the hydrophilic segments and the reinforcing segments are present in a weight ratio of 1.8:1 to 8:1; and
- wherein the hydrophilic segments and the silicone segments are present in a weight ratio of 1.3:1 to 4.5:1.

* * * * *